(12) United States Patent
Nakajima et al.

(10) Patent No.: US 10,346,106 B2
(45) Date of Patent: Jul. 9, 2019

(54) REMOTE COMMUNICATION CONTROL SYSTEM THAT IMPROVES SECURITY OF REMOTE SESSION BETWEEN IMAGE FORMING APPARATUS AND CONNECTION TERMINAL, REMOTE MAINTENANCE SYSTEM, AND RECORDING MEDIUM

(71) Applicant: KYOCERA Document Solutions Inc., Osaka (JP)

(72) Inventors: Koki Nakajima, Osaka (JP); Takeshi Nakamura, Osaka (JP); Keisuke Fukushima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/991,673

(22) Filed: May 29, 2018

(65) Prior Publication Data

US 2019/0004749 A1  Jan. 3, 2019

(30) Foreign Application Priority Data

Jun. 30, 2017  (JP) .................................. 2017-128658

(51) Int. Cl.
G06F 3/12 (2006.01)

(52) U.S. Cl.
CPC ............ *G06F 3/1225* (2013.01); *G06F 3/123* (2013.01); *G06F 3/1236* (2013.01); *G06F 3/1285* (2013.01)

(58) Field of Classification Search
USPC .............................................. 358/1.14, 1.15
See application file for complete search history.

(56) References Cited

U.S. PATENT DOCUMENTS

| | | | | |
|---|---|---|---|---|
| 2003/0002077 A1* | 1/2003 | Shima | ................... | G06F 3/1222 358/1.15 |
| 2003/0002977 A1* | 1/2003 | Camatti | ................ | F04D 29/083 415/104 |
| 2006/0195495 A1* | 8/2006 | Asano | .................. | G06F 3/1454 708/111 |
| 2017/0366701 A1* | 12/2017 | Ooba | ................. | H04N 1/32747 |

FOREIGN PATENT DOCUMENTS

JP  2006-238199 A  9/2006

* cited by examiner

*Primary Examiner* — Ngon B Nguyen
(74) *Attorney, Agent, or Firm* — Stein IP, LLC

(57) ABSTRACT

A remote communication control system includes a session relay system, a session management unit, and a remote maintenance unit. The session relay system associates a connection established with an image forming apparatus with a connection established with an electronic device located outside a network to which the image forming apparatus belongs, so as to relay a session between the image forming apparatus and the electronic device. The session management unit manages the session. The remote maintenance unit executes a remote maintenance to the image forming apparatus corresponding to an instruction from the electronic device. When the remote maintenance corresponding to the instruction is a specific remote maintenance, the session management unit terminates the session established to the image forming apparatus as a target for the remote maintenance corresponding to the instruction.

5 Claims, 20 Drawing Sheets

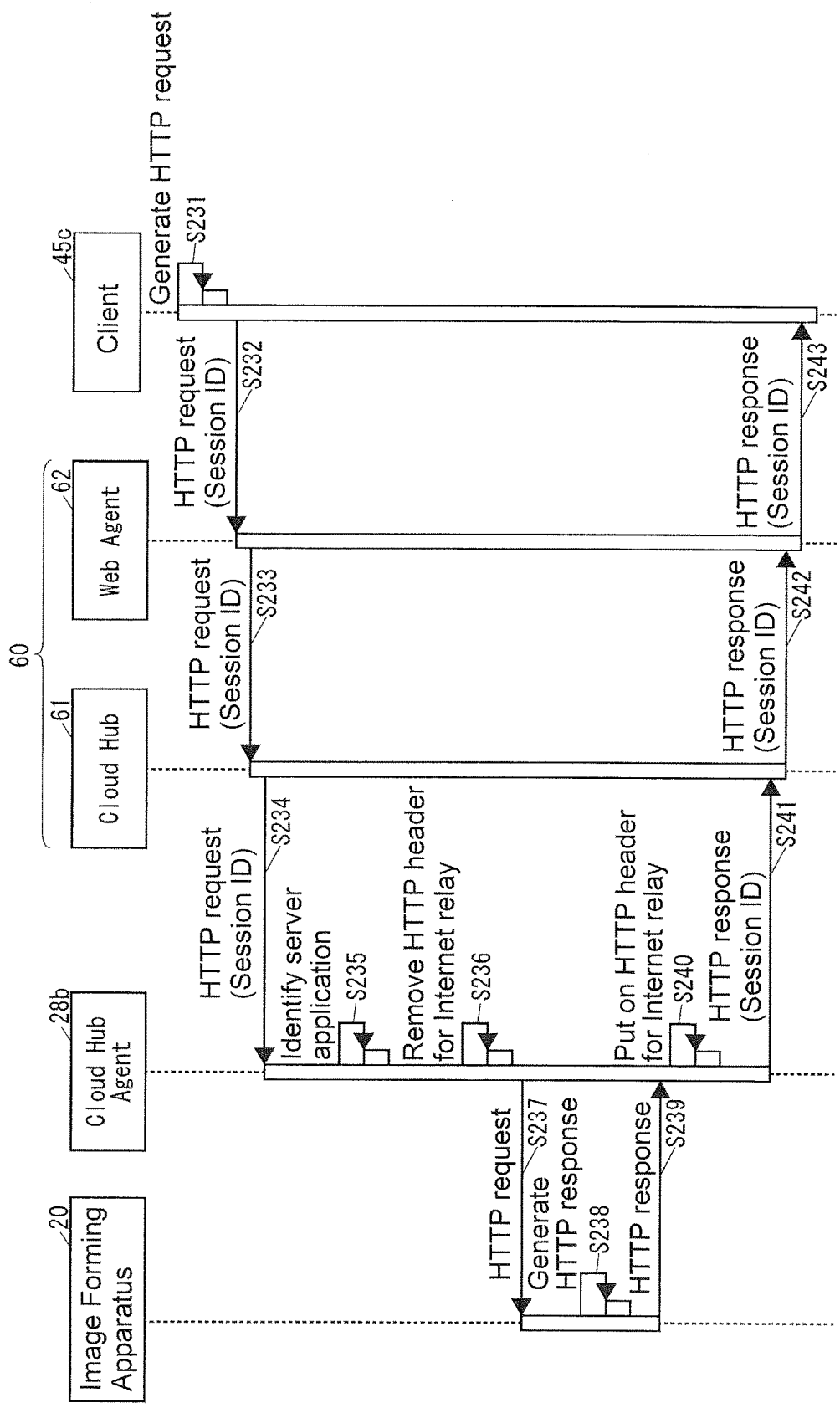

REMOTE COMMUNICATION CONTROL SYSTEM THAT IMPROVES SECURITY OF REMOTE SESSION BETWEEN IMAGE FORMING APPARATUS AND CONNECTION TERMINAL, REMOTE MAINTENANCE SYSTEM, AND RECORDING MEDIUM

INCORPORATION BY REFERENCE

This application is based upon, and claims the benefit of priority from, corresponding Japanese Patent Application No. 2017-128658 filed in the Japan Patent Office on Jun. 30, 2017, the entire contents of which are incorporated herein by reference.

BACKGROUND

Unless otherwise indicated herein, the description in this section is not prior art to the claims in this application and is not admitted to be prior art by inclusion in this section.

There is known a system that executes a communication between an image forming apparatus and an electronic device located inside a Local Area Network (LAN) to which the image forming apparatus belongs. This system causes the image forming apparatus to display a User Interface (UI) screen generated by the electronic device and causes the image forming apparatus to execute a print job based on print data accumulated in the electronic device.

SUMMARY

A remote communication control system according to one aspect of the disclosure includes a session relay system, a session management unit, and a remote maintenance unit. The session relay system associates a connection established with an image forming apparatus with a connection established with an electronic device located outside a network to which the image forming apparatus belongs, so as to relay a session between the image forming apparatus and the electronic device. The session management unit manages the session. The remote maintenance unit executes a remote maintenance to the image forming apparatus corresponding to an instruction from the electronic device. When the remote maintenance corresponding to the instruction is a specific remote maintenance, the session management unit terminates the session established to the image forming apparatus as a target for the remote maintenance corresponding to the instruction.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 11 illustrates an operation of the remote communication system according to the one embodiment when the image forming apparatus operates corresponding to a request from the connection terminal via the remote session;

DETAILED DESCRIPTION

Figure 1:
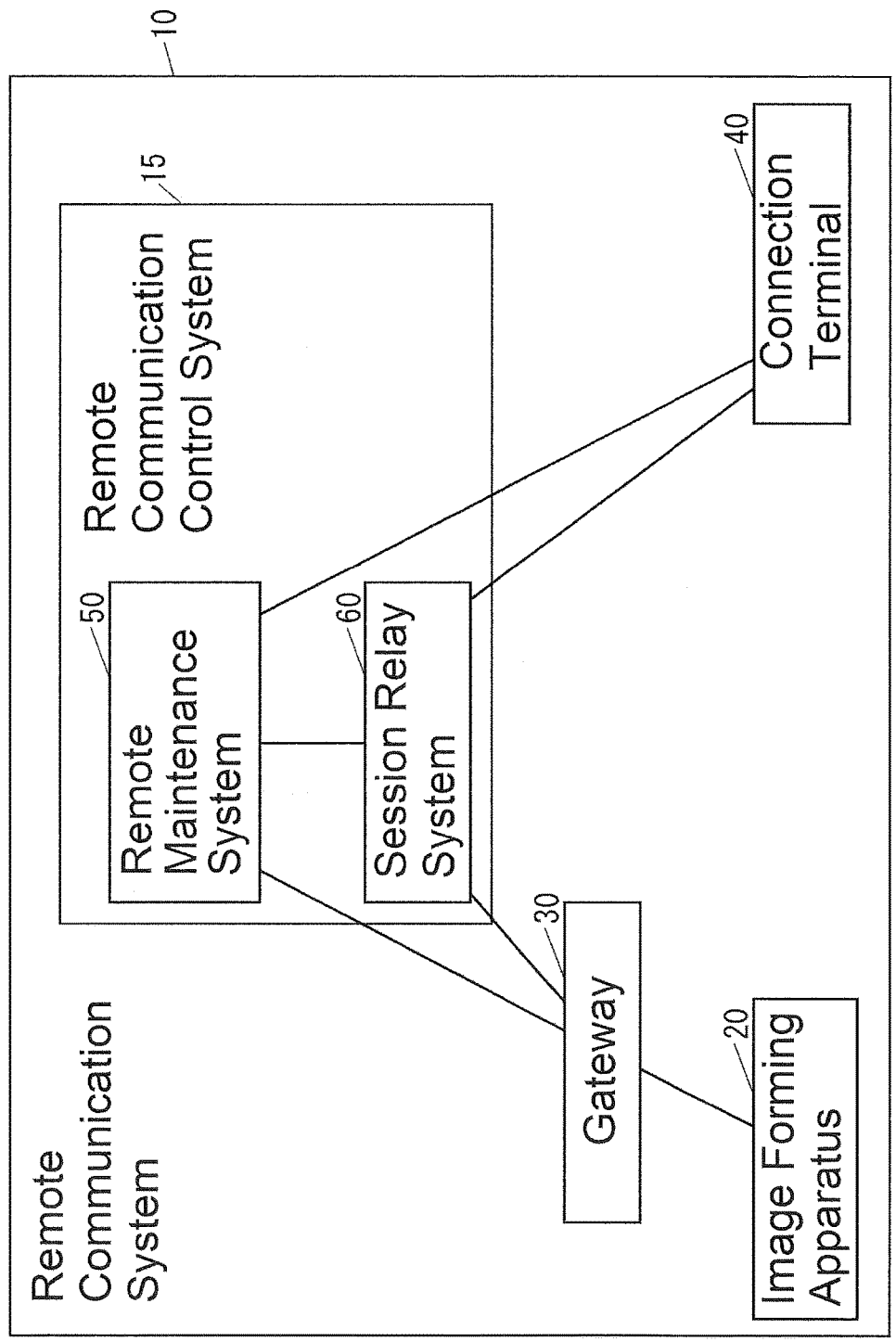
FIG. 1 illustrates a block diagram of a remote communication system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a configuration of a remote communication system according to the embodiment will be described.

FIG. 1 illustrates a block diagram of a remote communication system 10 according to the embodiment.

As illustrated in FIG. 1, the remote communication system 10 includes an image forming apparatus 20, a gateway 30, a connection terminal 40, and a remote communication control system 15. The gateway 30 connects a network, such as a Local Area Network (LAN), to which the image forming apparatus 20 belongs, to a network, such as the Internet. The connection terminal 40 is an electronic device located outside the network to which the image forming apparatus 20 belongs. The remote communication control system 15 controls a communication between the image forming apparatus included in the remote communication system 10 and the connection terminal included in the remote communication system 10.

The remote communication control system 15 includes a remote maintenance system 50 and a session relay system 60. The remote maintenance system 50 is a cloud service that executes a remote maintenance to the image forming apparatus included in the remote communication system 10 corresponding to an instruction from the connection terminal included in the remote communication system 10. The session relay system 60 is a cloud service that relays a direct interconnection between the image forming apparatus included in the remote communication system 10 and the connection terminal included in the remote communication system 10, that is, a Peer to Peer session (hereinafter referred to as a "remote session").

The remote communication system 10 can include an image forming apparatus in addition to the image forming apparatus 20 in the network to which the image forming apparatus 20 belongs. The remote communication system 10 can include a network to which an image forming apparatus belongs in addition to the network to which the image forming apparatus 20 belongs. The image forming apparatus included in the remote communication system 10 is, for example, an image forming apparatus, such as a Multifunction Peripheral (MFP), a printer-only machine, a copy-only machine, a FAX-only machine, and a scanner-only machine.

The gateway 30 configures a firewall that prevents an attack to an inside of the network to which the image forming apparatus 20 belongs from an outside of this network. Therefore, a communication between the image forming apparatus included in the remote communication system 10 and the remote maintenance system 50 is maintained by keeping the image forming apparatus included in the remote communication system 10 connecting to the remote maintenance system 50 by an Extensible Messaging and Presence Protocol (XMPP).

The remote communication system 10 can include a connection terminal in addition to the connection terminal 40. The connection terminal included in the remote communication system 10 is, for example, a computer, such as a Personal Computer (PC).

The remote maintenance system 50 is constituted of, for example, a server computer. The remote maintenance executed by the remote maintenance system 50 is, for example, maintenance, such as a confirmation of a counter of the image forming apparatus and an installation of firmware to the image forming apparatus. The remote maintenance system 50 not only executes the remote maintenance but also manages a remote session.

The session relay system 60 is constituted of, for example, a server computer.

The image forming apparatus included in the remote communication system 10 and the remote maintenance system 50 can communicate via a network, such as the Internet. The image forming apparatus included in the remote communication system 10 and the session relay system 60 can communicate via a network, such as the Internet. The connection terminal included in the remote communication system 10 and the remote maintenance system 50 can communicate via a network, such as the Internet. The connection terminal included in the remote communication system 10 and the session relay system 60 can communicate via a network, such as the Internet. The remote maintenance system 50 and the session relay system 60 can communicate via a network, such as the Internet.

Figure 2:
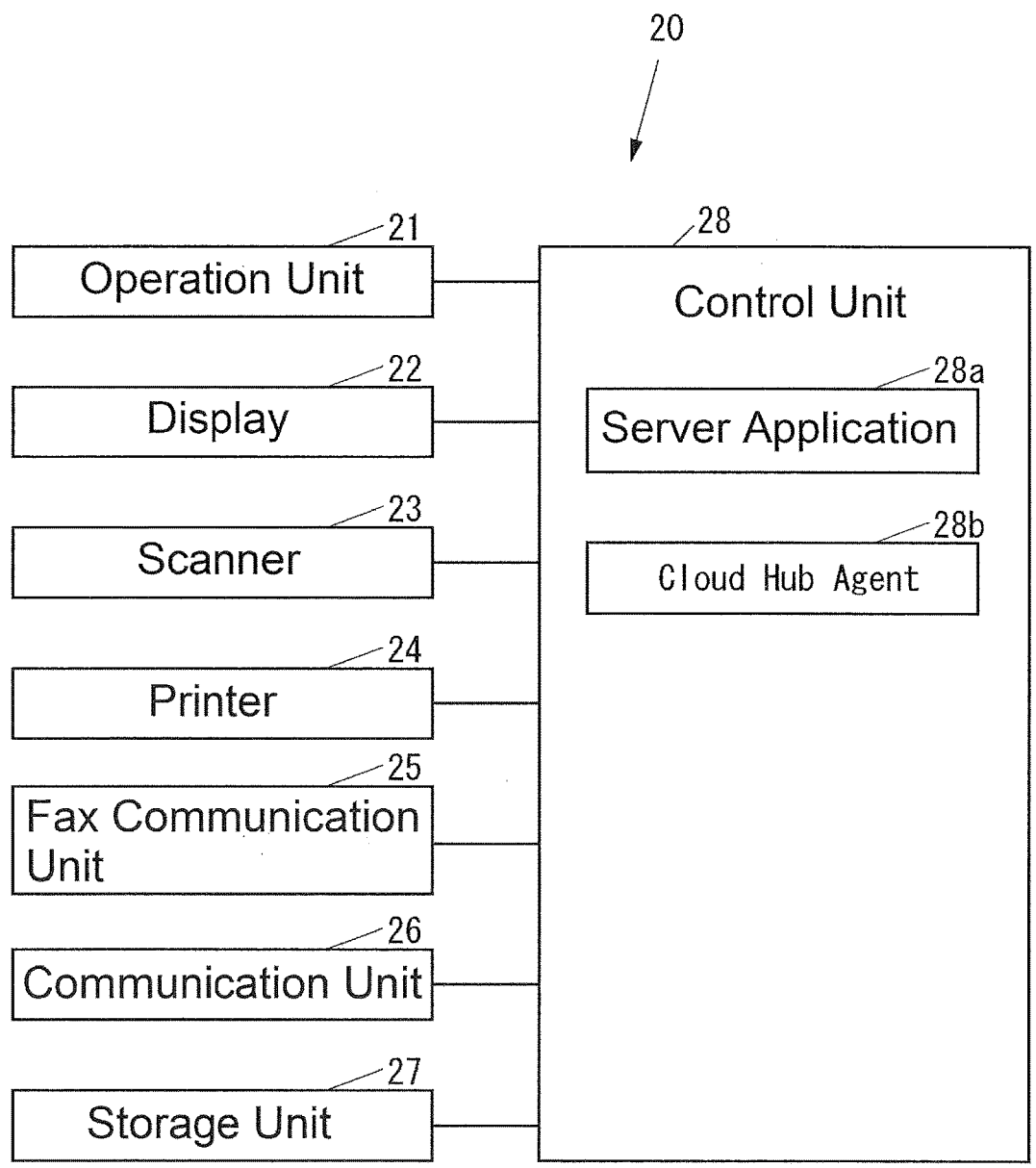
FIG. 2 illustrates a block diagram when an image forming apparatus according to the one embodiment is an MFP.

FIG. 2 illustrates a block diagram when the image forming apparatus 20 is an MFP.

The image forming apparatus 20 illustrated in FIG. 2 includes an operation unit 21, a display 22, a scanner 23, a printer 24, a fax communication unit 25, a communication unit 26, a storage unit 27, and a control unit 28. The operation unit 21 is an input device, such as buttons, with which various kinds of operations are input. The display 22 is a display device, such as a Liquid Crystal Display (LCD), that displays various pieces of information. The scanner 23 is a reading device that reads an image from an original document. The printer 24 is a print device that prints the image on a recording medium, such as a paper sheet. The fax communication unit 25 is a facsimile device that carries out fax communication with an external fax device (not illustrated) via a communication line, such as a dial-up line. The communication unit 26 is a communication device that communicates with an external device via a network or directly with wire or wireless without via a network. The storage unit 27 is a non-volatile storage device, such as a semiconductor memory and a Hard Disk Drive (HDD), that stores various pieces of information. The control unit 28 controls the whole image forming apparatus 20.

The control unit 28 includes, for example, a Central Processing Unit (CPU), a Read Only Memory (ROM) that stores programs and various data, and a Random Access Memory (RAM) used as a work area for the CPU. The CPU executes the programs stored in the ROM or the storage unit 27.

The control unit 28 executes the programs stored in the ROM or the storage unit 27 to implement a server application 28a used from the connection terminal included in the remote communication system 10 via the remote session and a Cloud Hub Agent 28b that controls a communication with the session relay system 60 (see FIG. 1).

The control unit 28 can implement a server application in addition to the server application 28a by executing the programs stored in the ROM or the storage unit 27.

The server application implemented by the control unit 28 includes, for example, a Web Server that notifies the outside of the network to which the image forming apparatus 20 belongs of various setting conditions of the image forming apparatus 20 and accepts various settings of the image forming apparatus 20 from the outside of the network to which the image forming apparatus 20 belongs. Additionally, the server application implemented by the control unit 28 includes, for example, a Remote APP Server that transmits data of a screen (for example, a Webpage) displayed on the display 22 of the image forming apparatus 20 to the outside of the network to which the image forming apparatus 20 belongs and receives an operation to the screen displayed based on this data from the outside of the network to which the image forming apparatus 20 belongs to cause the image forming apparatus 20 to operate corresponding to the received operation.

The server application implemented by the control unit 28 can be identified by an application ID.

Figure 3:
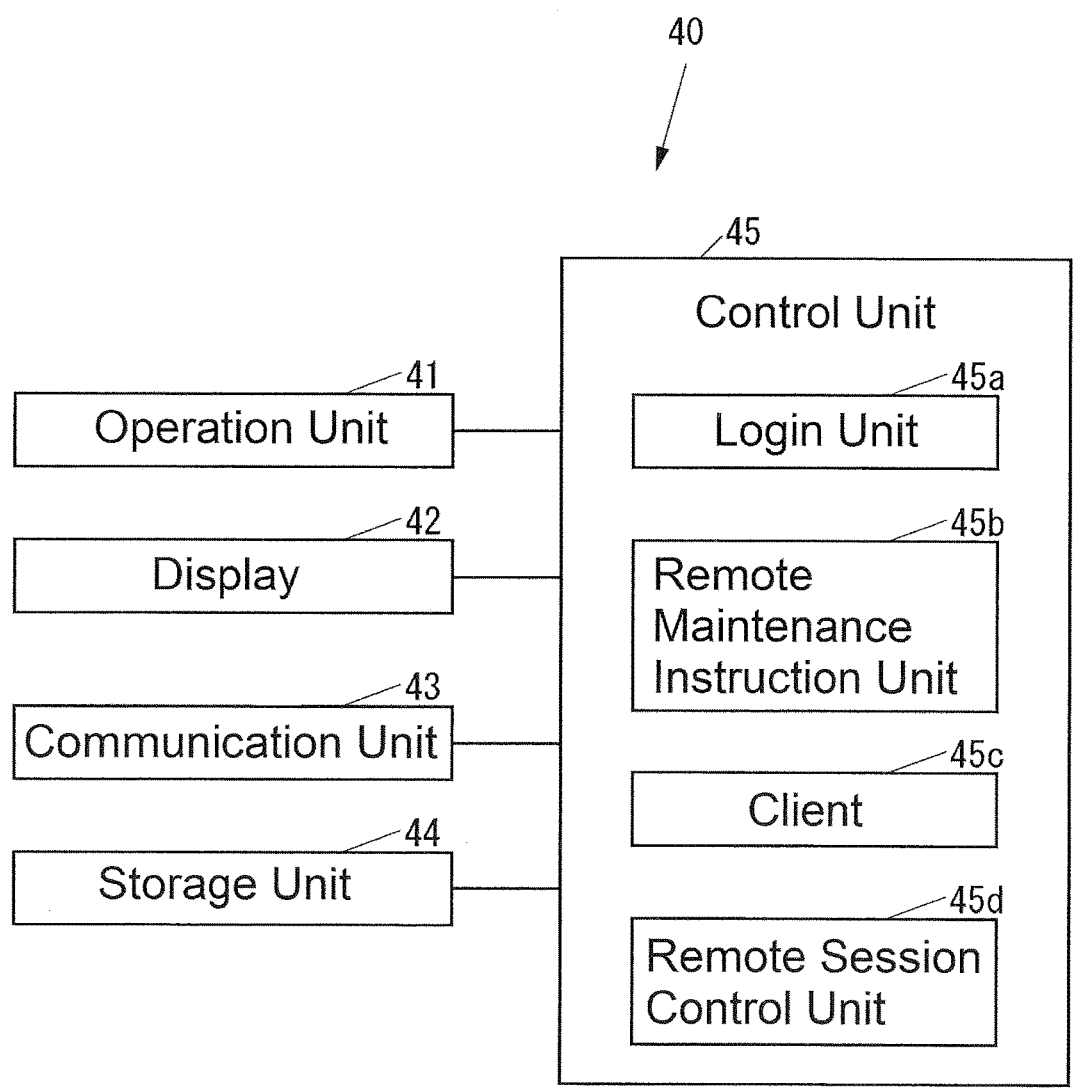
FIG. 3 illustrates a block diagram of a connection terminal according to the one embodiment.

FIG. 3 illustrates a block diagram of the connection terminal 40.

As illustrated in FIG. 3, the connection terminal 40 includes an operation unit 41, a display 42, a communication unit 43, a storage unit 44, and a control unit 45. The operation unit 41 is an input device, such as a keyboard and a mouse, with which various kinds of operations are input. The display 42 is a display device, such as an LCD, that displays various pieces of information. The communication unit 43 is a communication device that communicates with an external device via the network or directly with wire or wireless without via the network. The storage unit 44 is a non-volatile storage device, such as a semiconductor memory and an HDD, that stores various pieces of information. The control unit 45 controls the whole connection terminal 40.

The control unit 45 includes, for example, a CPU, a ROM that stores programs and various data, and a RAM used as a work area for the CPU. The CPU executes the programs stored in the ROM or the storage unit 44.

The control unit 45 executes the programs stored in the ROM or the storage unit 44 to implement a login unit 45a, a remote maintenance instruction unit 45b, a client 45c, and a remote session control unit 45d. The login unit 45a executes a login process to the remote maintenance system 50. The remote maintenance instruction unit 45b instructs the remote maintenance to the remote maintenance system 50. The client 45c uses the server application of the image forming apparatus included in the remote communication system 10 via the remote session. The remote session control unit 45d controls the remote session.

The control unit 45 can implement a client in addition to the client 45c by executing the programs stored in the ROM or the storage unit 44.

The client implemented by the control unit 45 includes, for example, a Web Browser that displays a setting condition notified from the Web Server as the server application on the display 42 and instructs various kinds of settings input from the operation unit 41 to this Web Server. Additionally, the client implemented by the control unit 45 includes, for example, an application, such as a Remote APP Client, that displays a screen based on data of a screen received from a Remote APP Server as a server application on the display 42 and transmits the operation input to this screen from the operation unit 41 to this Remote APP Server.

The client implemented by the control unit 45 can be identified by an application ID. The application ID for identifying the client implemented by the control unit 45 is identical to the application ID for identifying the server application of the image forming apparatus corresponding to this client.

Figure 4:
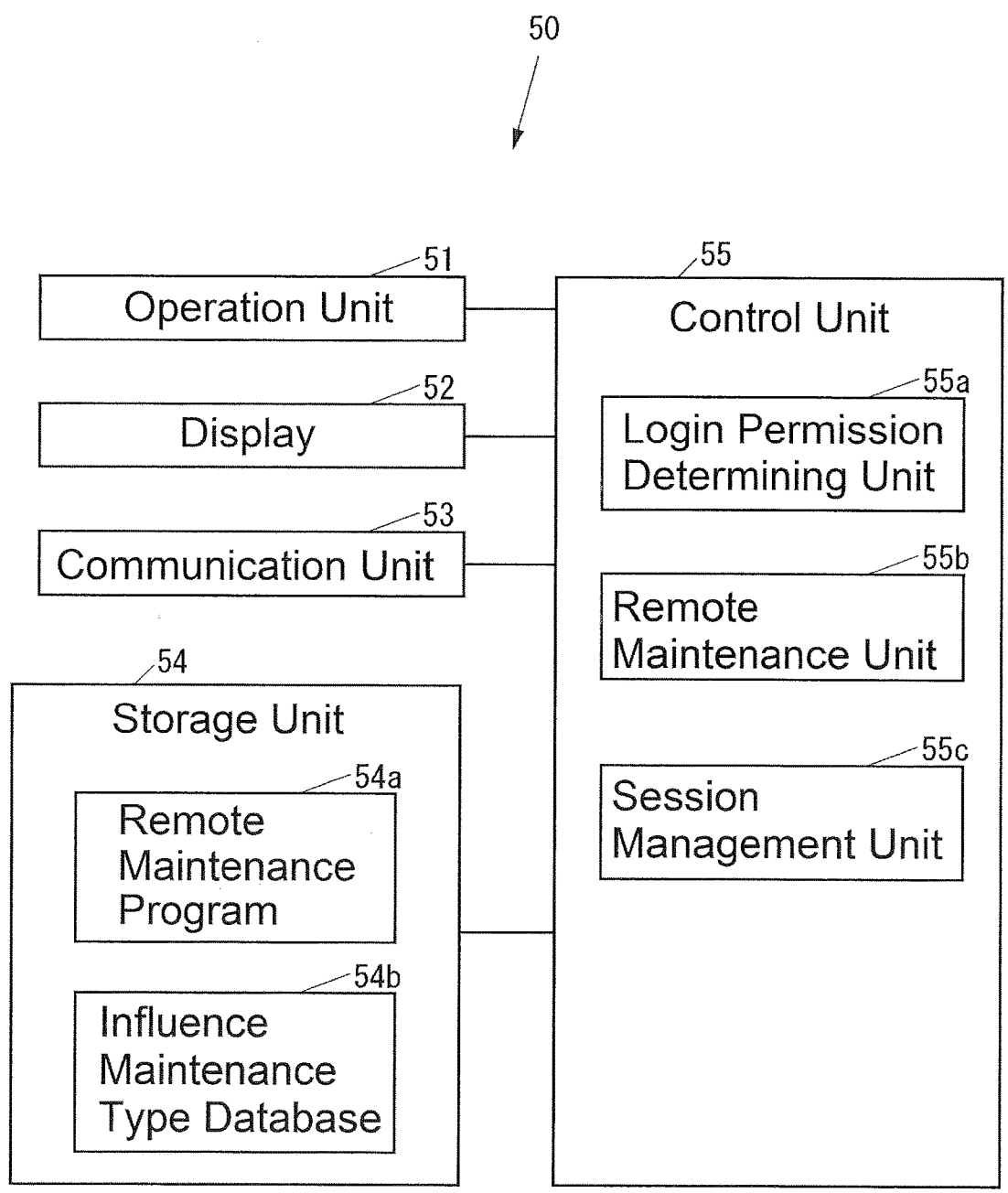
FIG. 4 illustrates a block diagram of a remote maintenance system according to the one embodiment when the remote maintenance system is configured using one server computer.

FIG. 4 illustrates a block diagram of the remote maintenance system 50 when the remote maintenance system 50 is configured using one server computer.

As illustrated in FIG. 4, the remote maintenance system 50 includes an operation unit 51, a display 52, a communication unit 53, a storage unit 54, and a control unit 55. The operation unit 51 is an input device such as a keyboard and a mouse to which various kinds of operations are input. The display 52 is a display device such as an LCD that displays various kinds of information. The communication unit 53 is a communication device that communicates with an external device via the network or directly with wire or wireless without via the network. The storage unit 54 is a non-volatile storage device such as a semiconductor memory and an HDD that stores various kinds of information. The control unit 55 controls the entire remote maintenance system 50.

The storage unit 54 stores a remote maintenance program 54a for managing the remote session.

The storage unit 54 stores an influence maintenance type database 54b indicating a type of the remote maintenance affecting continuation of the remote session. The remote maintenance affecting the continuation of the remote session is a remote maintenance that cannot maintain a communication by the remote session such as a remote maintenance involving a reboot of the image forming apparatus and a remote maintenance involving reconnection of the network by the image forming apparatus. For example, the remote maintenance affecting the continuation of the remote session includes update of firmware of the image forming apparatus, the remote maintenance involving the reboot of the image forming apparatus and the reconnection of the network by the image forming apparatus in association with the reboot of the image forming apparatus.

The control unit 55 includes, for example, a CPU, a ROM that stores programs and various kinds of data, and a RAM used as a work area of the CPU. The CPU executes the programs stored in the ROM or the storage unit 54.

The control unit 55 executes the remote maintenance program 54a to implement a login permission determining unit 55a, a remote maintenance unit 55b, and a session management unit 55c. The login permission determining unit 55a determines whether to permit the login by a user. The remote maintenance unit 55b executes the remote maintenance. The session management unit 55c manages the remote session.

Figure 5:
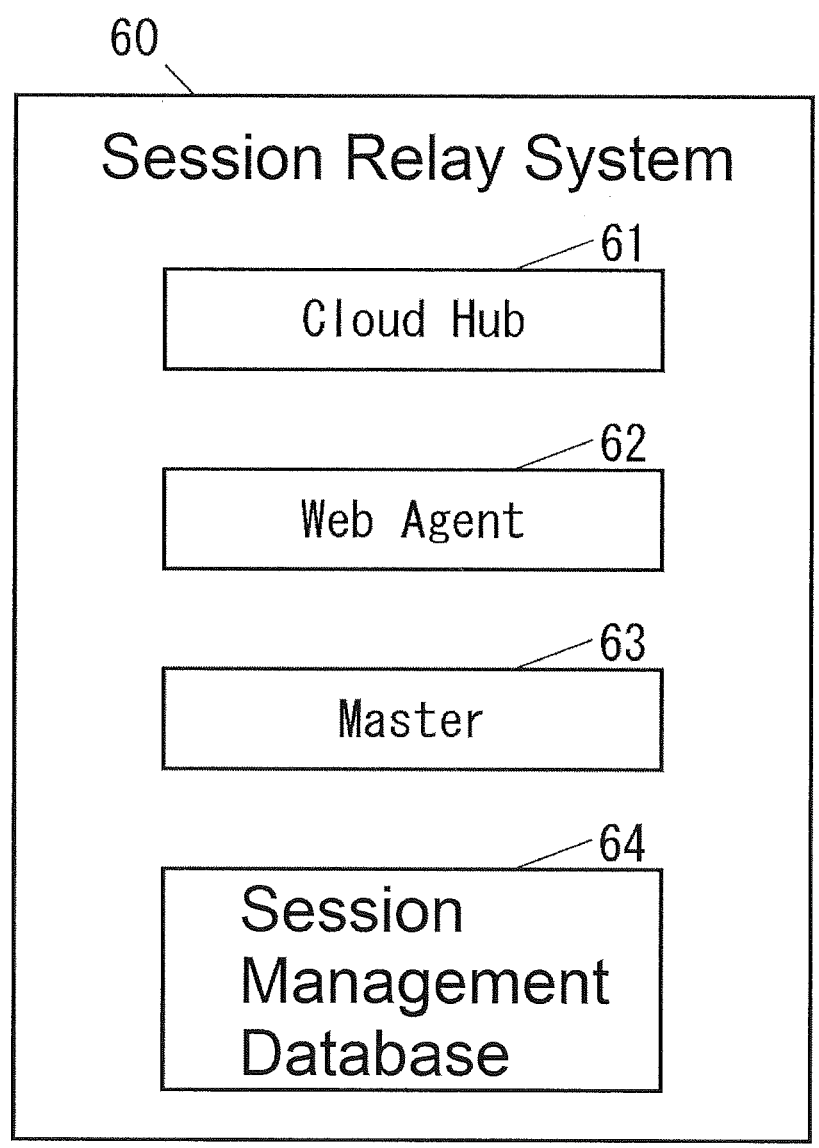
FIG. 5 illustrates a function implemented by a session relay system according to the one embodiment.

FIG. 5 illustrates a function implemented by the session relay system 60.

As illustrated in FIG. 5, the session relay system 60 executes a specific program to implement a Cloud Hub 61 that controls a communication with the image forming apparatus included in the remote communication system 10. The session relay system 60 executes a specific program so as to ensure implementing a Cloud Hub in addition to the Cloud Hub 61.

The session relay system 60 executes a specific program to implement a Web Agent 62 that controls a communication with the connection terminal included in the remote communication system 10. The session relay system 60 executes a specific program so as to ensure implementing a Web Agent in addition to the Web Agent 62.

The session relay system 60 executes a specific program to implement a Master 63 and a session management database 64. The Master 63 determines which Cloud Hub is connected to the image forming apparatus and which Web Agent is connected to the connection terminal. The session management database 64 stores a log relating to the remote session.

The Cloud Hub included in the session relay system 60 and the Web Agent included in the session relay system 60 are in a relationship on a one-to-one basis. That is, a count of the Cloud Hub included in the session relay system 60 and a count of the Web Agent included in the session relay system 60 are identical.

When the image forming apparatus included in the remote communication system 10 is connected to the session relay system 60, the Master 63 determines which Cloud Hub is connected to this image forming apparatus. However, an operation of the Master 63 will not be further elaborated below.

Similarly, when the connection terminal included in the remote communication system 10 is connected to the session relay system 60, the Master 63 determines which Web Agent is connected to this connection terminal. However, an operation of the Master 63 will not be further elaborated below.

Next, an operation of the remote communication system 10 will be described.

First, an operation of the remote communication system 10 when a user of the connection terminal 40 logs in to the remote maintenance system 50 will be described.

Figure 6:
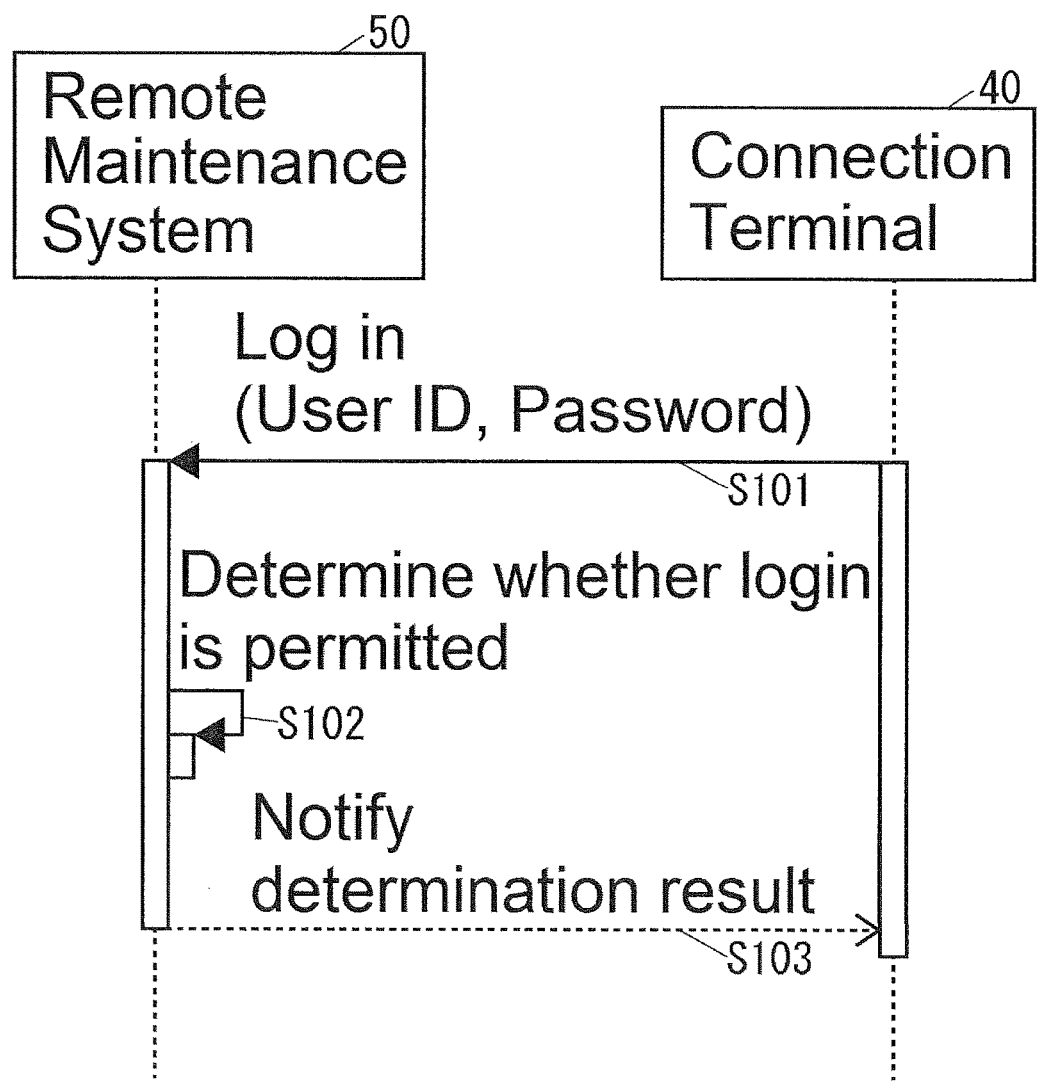
FIG. 6 illustrates an operation of the remote communication system according to the one embodiment when a user of the connection terminal logs in to the remote maintenance system.

FIG. 6 illustrates the operation of the remote communication system 10 when the user of the connection terminal 40 logs in to the remote maintenance system 50.

The user of the connection terminal 40 can instruct a login to the remote maintenance system 50 by inputting a user ID and a password via the operation unit 41. When accepting the instruction to log in to the remote maintenance system 50, the login unit 45a of the connection terminal 40 notifies the remote maintenance system 50 of the user ID and the password input via the operation unit 41 as illustrated in FIG. 6 to execute a login process to the remote maintenance system 50 (Step S101).

The login permission determining unit 55a of the remote maintenance system 50 determines whether the login of the user is permitted or not based on a combination of the user ID and the password notified from the connection terminal 40 when the connection terminal 40 requests the login (Step S102), and replies a determination result to the connection terminal 40 (Step S103).

Next, an operation of the remote communication system 10 when the remote session is started will be described.

Figure 7:
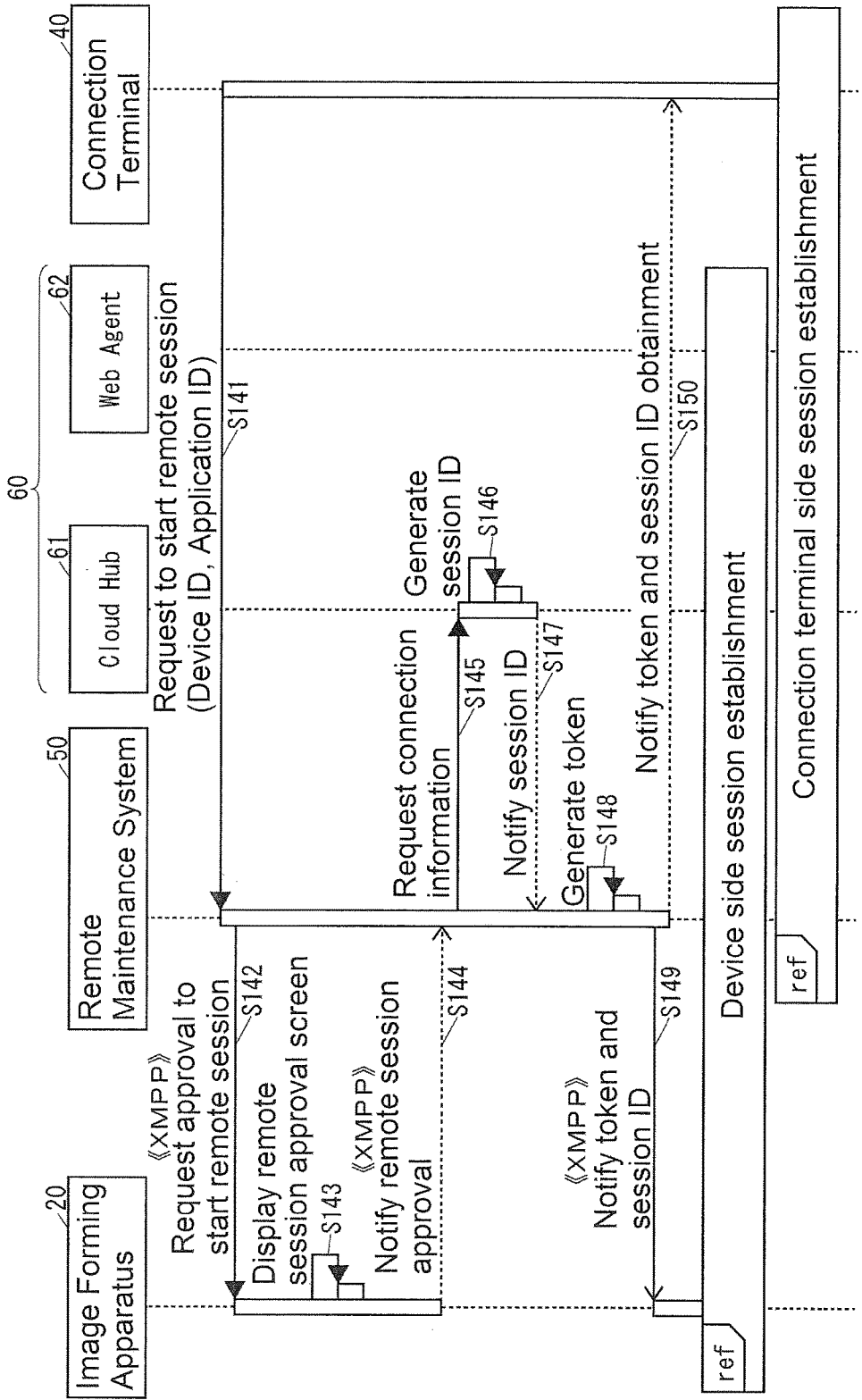
FIG. 7 illustrates an operation of the remote communication system according to the one embodiment when a remote session is started.
Figure 8:
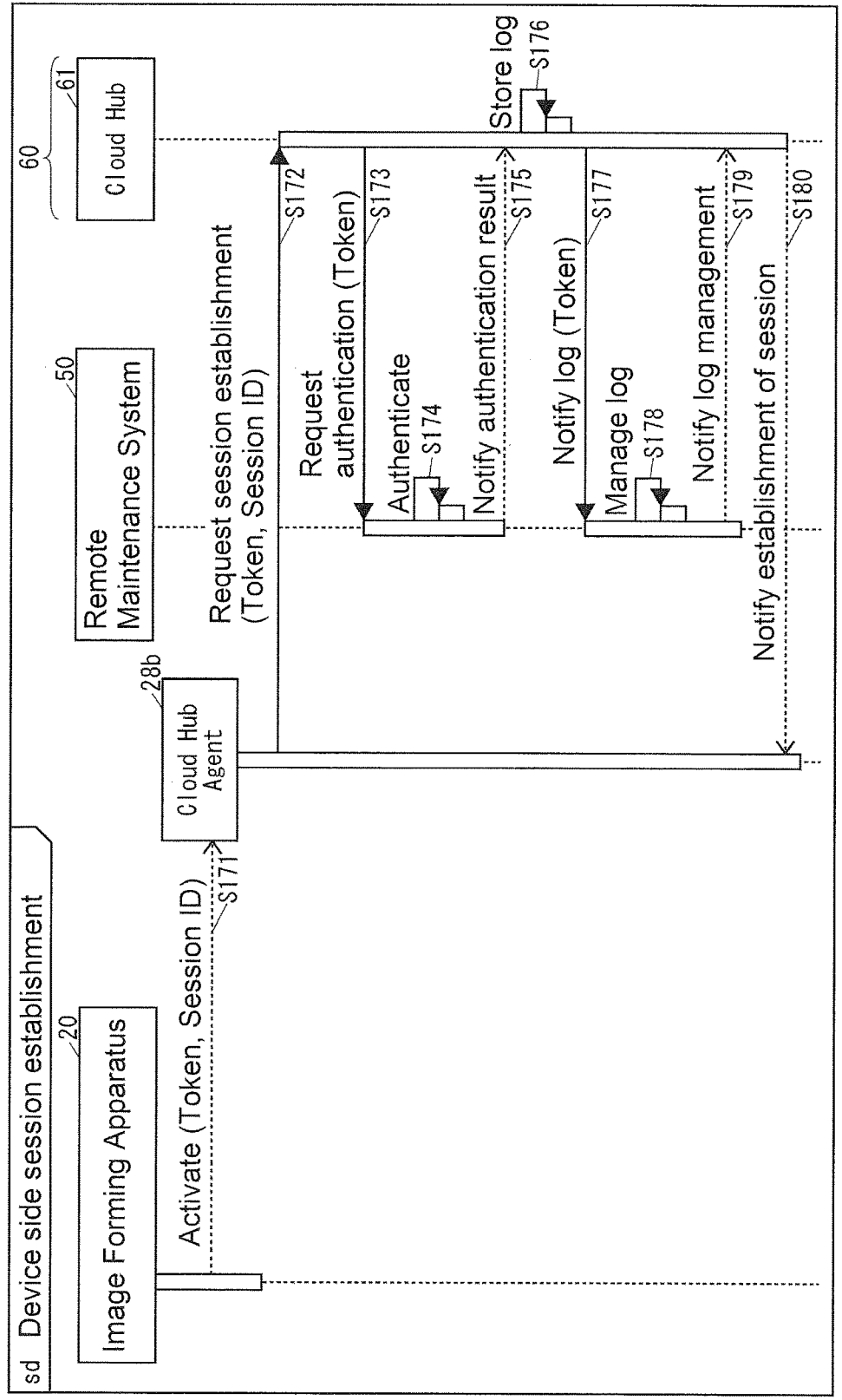
FIG. 8 illustrates a sequence diagram of a device side session establishment illustrated in FIG. 7.
Figure 9:
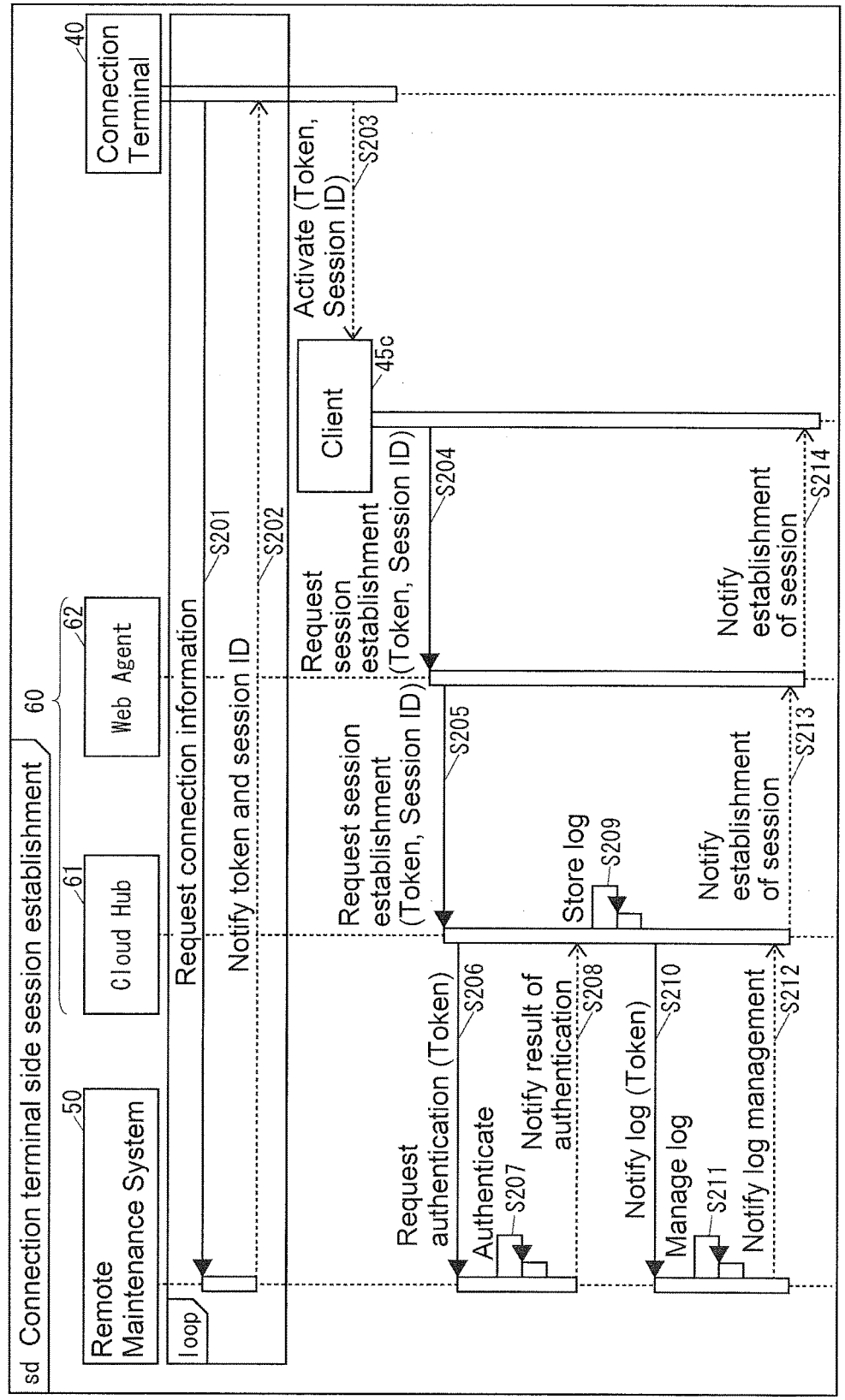
FIG. 9 illustrates a sequence diagram of a connection terminal side session establishment illustrated in FIG. 7.

FIG. 7 illustrates the operation of the remote communication system 10 when the remote session is started. FIG. 8 illustrates a sequence diagram of a device side session establishment illustrated in FIG. 7. FIG. 9 illustrates a sequence diagram of a connection terminal side session establishment illustrated in FIG. 7.

When logging in to the remote maintenance system 50, the user of the connection terminal 40 can designate a specific client (hereinafter described as the client 45c in the description of the operation illustrated in FIGS. 7 to 9) and instruct to start the remote session with a specific image forming apparatus (hereinafter described as the image forming apparatus 20 in the description of the operation illustrated in FIGS. 7 to 9) via the operation unit 41. As illustrated in FIGS. 7 to 9, when accepting the instruction to start the remote session, the remote session control unit 45d of the connection terminal 40 notifies the remote maintenance system 50 of the device ID of the image forming apparatus 20 instructed via the operation unit 41 and an application ID of the client 45c instructed via the operation unit 41 to request the remote maintenance system 50 to start the remote session (Step S141).

It is preferred that the user of the connection terminal 40 separately inform a user of the image forming apparatus 20 of the fact that starting the remote session with the image forming apparatus 20 is desired by means of, for example, a telephone call in advance before instructing to start the remote session with the image forming apparatus 20 via the operation unit 41 when the user of the connection terminal 40 instructs to the start of the remote session with the image forming apparatus 20 via the operation unit 41.

When accepting the request of Step S141, the session management unit 55c of the remote maintenance system 50 notifies the image forming apparatus 20 specified by the device ID notified at Step S141 of the application ID notified at Step S141 to request an approval to start the remote session by the XMPP (Step S142).

When receiving the request of Step S142, the server application 28a specified by the application ID notified at Step S142 among the server applications of the image forming apparatus 20 displays a remote session approval screen 70 (see FIG. 10) that accepts the instruction whether to approve the start of the remote session on the display 22 (Step S143).

Figure 10:
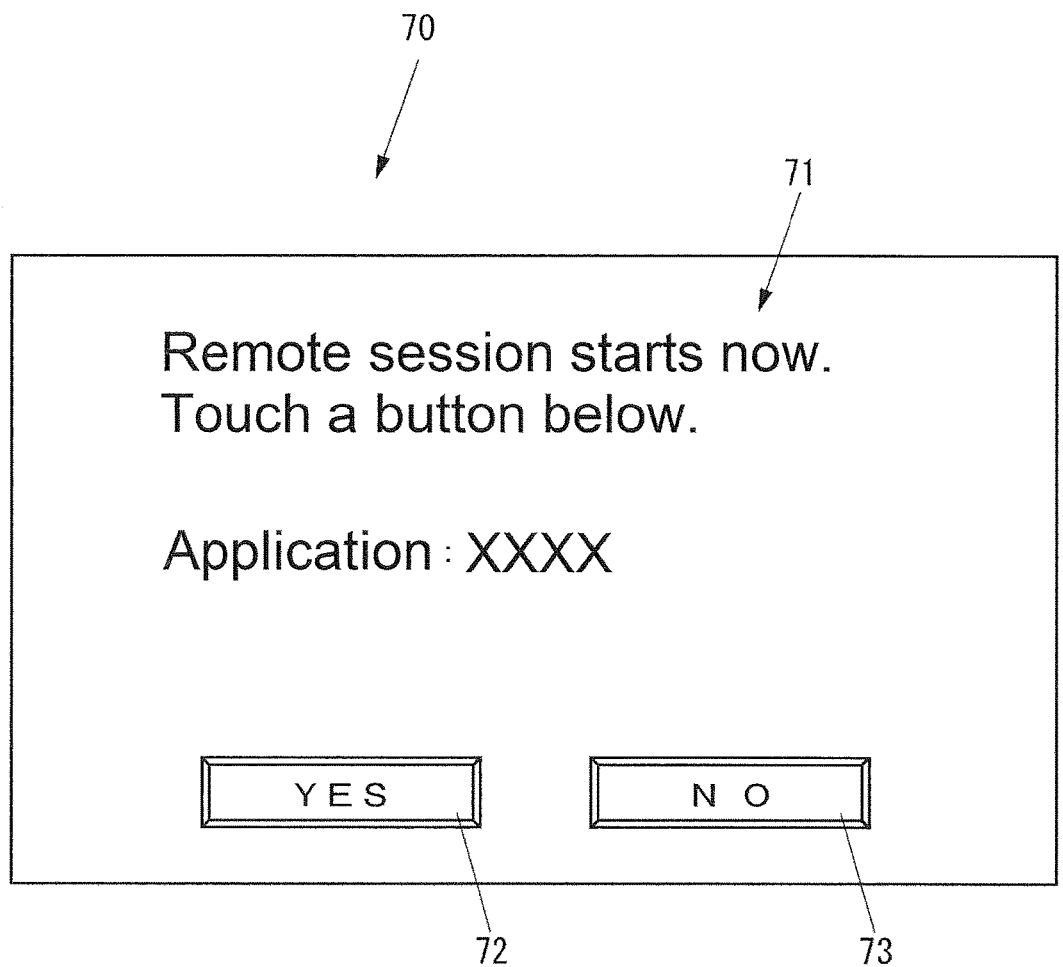
FIG. 10 illustrates an exemplary remote session approval screen displayed in the operation illustrated in FIG. 7.

FIG. 10 illustrates an example of the remote session approval screen 70.

The remote session approval screen 70 illustrated in FIG. 10 includes a message 71, a YES button 72, and a NO button 73. The message 71 queries whether the remote session is approved or not. The YES button 72 is for accepting an instruction to approve starting the remote session. The NO button 73 is for accepting an instruction not to approve starting the remote session. The user of the image forming apparatus 20 can press any one of the YES button 72 and the NO button 73 via the operation unit 21.

As illustrated in FIGS. 7 to 9, when the YES button 72 is pressed via the operation unit 21, the server application 28a notifies the remote maintenance system 50 of the fact that the remote session is approved by the XMPP (Step S144).

Although the illustration is omitted, when the NO button 73 is pressed to the remote session approval screen 70 displayed on the display 22 via the operation unit 21 at Step S143, the remote communication system 10 operates as follows. First, the server application 28a of the image forming apparatus 20 notifies the remote maintenance system 50 of the fact that the remote session has failed to be approved by the XMPP. Next, the session management unit 55c of the remote maintenance system 50 notifies the connection terminal 40 of the fact that the remote session has failed to be approved. Then, the remote session control unit 45d of the connection terminal 40 displays the fact that the remote session has failed to be approved on the display 42.

When receiving the notification of Step S144, the session management unit 55c of the remote maintenance system 50 requests connection information to the session relay system 60 by an Application Program Interface (API) (Step S145).

When receiving the request of Step S145, the Cloud Hub 61 of the session relay system 60 generates a session ID for the session relay system 60 to identify the communication made by this remote session (Step S146), and notifies the remote maintenance system 50 of the generated session ID as the connection information using the API (Step S147). As the session ID, random identification information is employed. The random identification information includes, for example, a random number sequence generated by a hash algorithm, such as a Hash-based Message Authentication Code (HMAC), which is BASE64 encoded so as to be handled on a Hypertext Transfer Protocol (HTTP).

When the session ID is notified at Step S147, the session management unit 55c of the remote maintenance system 50 generates a token for the remote maintenance system 50 to recognize a valid duration of the remote session (Step S148), and notifies the image forming apparatus 20 of the generated token and the session ID notified at Step S147 by the XMPP (Step S149).

Next, the session management unit 55c notifies the connection terminal 40 of the fact that the token and the session ID are obtained (Step S150).

When the token and the session ID are notified at Step S149, the server application 28a of the image forming apparatus 20 activates the Cloud Hub Agent 28b to which the token and the session ID notified at Step S149 are set (Step S171).

Next, the Cloud Hub Agent 28b notifies the session relay system 60 of the set token and session ID to request the session relay system 60 to establish the session (Step S172).

When receiving the request of Step S172, the Cloud Hub 61 associated with the session ID notified at Step S172 among the Cloud Hubs of the session relay system 60 requests the remote maintenance system 50 to execute an authentication by the token notified at Step S172, using the API (Step S173). Accordingly, the session management unit 55c of the remote maintenance system 50 executes the authentication requested at Step S173 (Step S174), and notifies the session relay system 60 of a result of the authentication using the API (Step S175).

When a successful authentication is notified at Step S175, the Cloud Hub 61 of the session relay system 60 stores a log indicating the start of the session with the image forming apparatus 20 in the session management database 64 (Step S176), and notifies the remote maintenance system 50 of the log stored at Step S176 together with the token, using the API (Step S177). Accordingly, the session management unit 55c of the remote maintenance system 50 manages the log notified at Step S177 as a log of the remote session identified by the token notified at Step S177 (Step S178), and replies the fact that this log is managed to the session relay system 60, using the API (Step S179).

When the successful authentication is notified at Step S175, the Cloud Hub 61 of the session relay system 60 notifies the image forming apparatus 20 of the fact that the session with the image forming apparatus 20 is established (Step S180). That is, an HTTP-based WebSocket connection is established between the image forming apparatus 20 and the session relay system 60.

After the process at Step S141, the remote session control unit 45d of the connection terminal 40 requests the connection information to the remote maintenance system 50 by polling until the connection information can be obtained from the remote maintenance system 50 (Step S201).

When the token is already generated at Step S148 when the session management unit 55c of the remote maintenance system 50 receives the request of Step S201, the session management unit 55c of the remote maintenance system 50 notifies the connection terminal 40 of this token and the session ID notified from the session relay system 60 at Step S147 as the connection information (Step S202).

When the token and the session ID are notified at Step S202, the remote session control unit 45d of the connection terminal 40 activates the client 45c to which the token and the session ID notified at Step S202 are set (Step S203).

Next, the client 45c notifies the session relay system 60 of the set token and session ID to request the session relay system 60 to establish the session (Step S204).

When receiving the request of Step S204, the Web Agent 62 associated with the session ID notified at Step S204 among the Web Agents of the session relay system 60 notifies the Cloud Hub 61 of the token and the session ID notified at Step S204 to request the Cloud Hub 61 to establish the session (Step S205).

When receiving the request of Step S205, the Cloud Hub 61 of the session relay system 60 requests the remote maintenance system 50 to execute an authentication by the token notified at Step S205, using the API (Step S206). Accordingly, the session management unit 55c of the remote maintenance system 50 executes the authentication requested at Step S206 (Step S207), and notifies the session relay system 60 of a result of the authentication using the API (Step S208).

When a successful authentication is notified at Step S208, the Cloud Hub 61 of the session relay system 60 stores a log indicating the start of the session with the connection terminal 40 in the session management database 64 (Step S209), and notifies the remote maintenance system 50 of the log stored at Step S209 together with the token, using the API (Step S210). Accordingly, the session management unit 55c of the remote maintenance system 50 manages the log notified at Step S210 as a log of the remote session identified by the token notified at Step S210 (Step S211), and replies the fact that this log is managed to the session relay system 60, using the API (Step S212).

When the successful authentication is notified at Step S208, the Cloud Hub 61 of the session relay system 60 notifies the Web Agent 62 of the fact that the session with the connection terminal 40 is established (Step S213). Accordingly, the Web Agent 62 notifies the connection terminal 40 of the fact that the session with the connection terminal 40 is established (Step S214). That is, an HTTP-based Web-Socket connection is established between the connection terminal 40 and the session relay system 60.

The session relay system 60 associates the WebSocket connection established with the image forming apparatus 20 by the operation illustrated in FIGS. 7 to 9 with the WebSocket connection established with the connection terminal 40 by the operation illustrated in FIGS. 7 to 9, using the session ID. Accordingly, the remote session is established by the operation illustrated in FIGS. 7 to 9.

The following describes an operation of the remote communication system 10 when the image forming apparatus 20 operates corresponding to the request from the connection terminal 40 via the remote session.

FIG. 11 illustrates the operation of the remote communication system 10 when the image forming apparatus 20 operates corresponding to the request from the connection terminal 40 via the remote session.

When the remote session is established by the operation illustrated in FIGS. 7 to 9, the user of the connection terminal 40 can instruct a request toward the image forming apparatus 20 via the operation unit 41. When accepting the instruction to request toward the image forming apparatus 20, the client 45c of the connection terminal 40 generates an HTTP request for notifying the request instructed via the operation unit 41 as illustrated in FIG. 11 (Step S231).

Here, a structure of the HTTP request generated at Step S232 will be described.

Figure 12A:
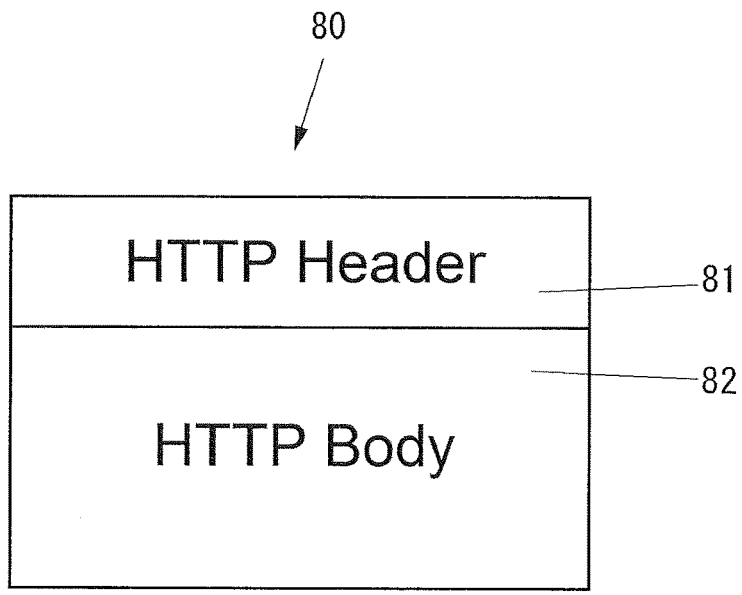
FIG. 12A illustrates HTTP data processed by a server application in the operation illustrated in FIG. 11.
Figure 12B:
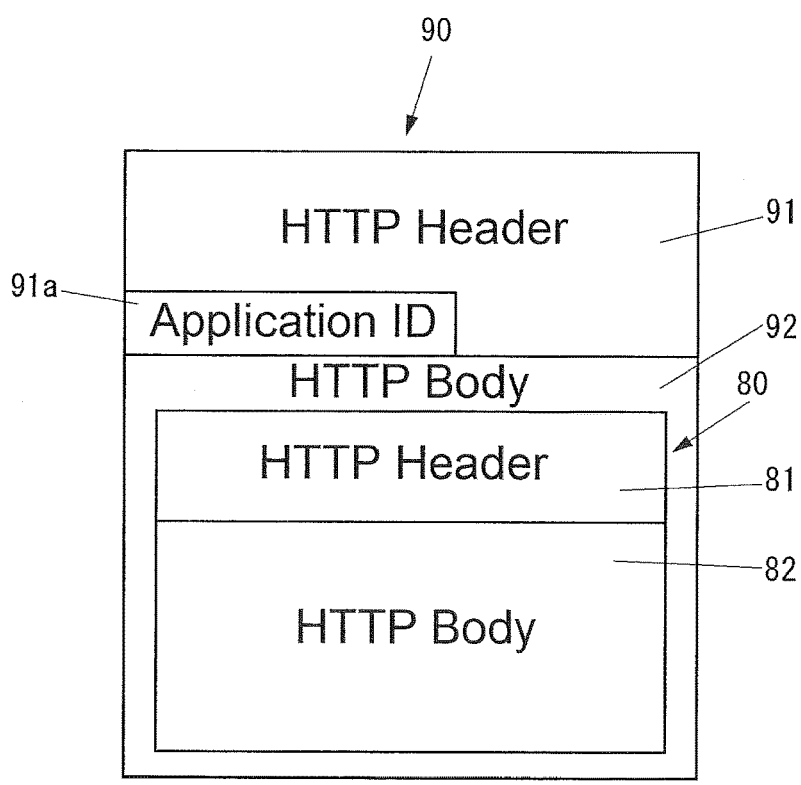
FIG. 12B illustrates HTTP data for relaying the HTTP data illustrated in FIG. 12A on the Internet.

FIG. 12A illustrates HTTP data 80 processed by the server application 28a. FIG. 12B illustrates HTTP data 90 for relaying the HTTP data 80 illustrated in FIG. 12A on the Internet.

As illustrated in FIGS. 12A and 12B, the HTTP data 80 includes an HTTP header 81 and an HTTP body 82. The HTTP data 90 includes an HTTP header 91 for relaying on the Internet and the HTTP data 80 as an HTTP body 92. The HTTP header 91 includes an application ID 91a for identifying the server application 28a.

The client 45c generates HTTP data having a structure similar to that of the HTTP data 90 illustrated in FIG. 12B as the HTTP request for notifying the request instructed via the operation unit 41. Here, the session ID is stored in a position corresponding to the HTTP header 91.

As illustrated in FIG. 11, the client 45c of the connection terminal 40 transmits the HTTP request generated at Step S231 to the session relay system 60 by the WebSocket connection (Step S232).

When the HTTP request is transmitted at Step S232, the Web Agent 62 associated with the session ID included in the HTTP request transmitted at Step S232 among the Web Agents of the session relay system 60 passes this HTTP request to the Cloud Hub 61 (Step S233). Accordingly, the Cloud Hub 61 transmits this HTTP request to the image forming apparatus 20 by the WebSocket connection corresponding to the session ID included in this HTTP request (Step S234).

When the HTTP request is transmitted at Step S234, the Cloud Hub Agent 28b of the image forming apparatus 20 identifies the server application 28a corresponding to the application ID included in this HTTP request (Step S235).

Next, the Cloud Hub Agent 28b generates an HTTP request that is made by removing the HTTP header for relaying on the Internet from the HTTP request transmitted at Step S234 (Step S236). Here, the HTTP request generated at Step S236 is HTTP data having a structure similar to that of the HTTP data 80 illustrated in FIG. 12A.

Next, the Cloud Hub Agent 28b passes the HTTP request generated at Step S236 to the server application 28a identified at Step S235 (Step S237).

When the HTTP request is passed at Step S237, the server application 28a generates an HTTP response corresponding to this HTTP request (Step S238). Here, the HTTP response generated at Step S238 is HTTP data having a structure similar to that of the HTTP data 80 illustrated in FIG. 12A.

Next, the server application 28a passes the HTTP response generated at Step S238 to the Cloud Hub Agent 28b (Step S239).

When the HTTP response is passed at Step S239, the Cloud Hub Agent 28b generates an HTTP response that is made by putting on the HTTP header for relaying on the Internet to the HTTP response passed at Step S239 (Step S240). Here, the HTTP response generated at Step S240 is HTTP data having a structure similar to that of the HTTP data 90 illustrated in FIG. 12B. The session ID is stored in a position corresponding to the HTTP header 91.

The Cloud Hub Agent 28b transmits the HTTP response generated at Step S240 to the session relay system 60 by the WebSocket connection (Step S241).

When the HTTP response is transmitted at Step S241, the Cloud Hub 61 associated with the session ID included in the HTTP response transmitted at Step S241 among the Cloud Hubs in the session relay system 60 passes this HTTP response to the Web Agent 62 (Step S242). Accordingly, the Web Agent 62 transmits this HTTP response to the connection terminal 40 by the WebSocket connection corresponding to the session ID included in this HTTP response (Step S243).

Accordingly, the client 45c of the connection terminal 40 can receive the HTTP response transmitted at Step S243.

Next, an operation of the remote communication system 10 when the remote session is terminated will be described.

Figure 13:
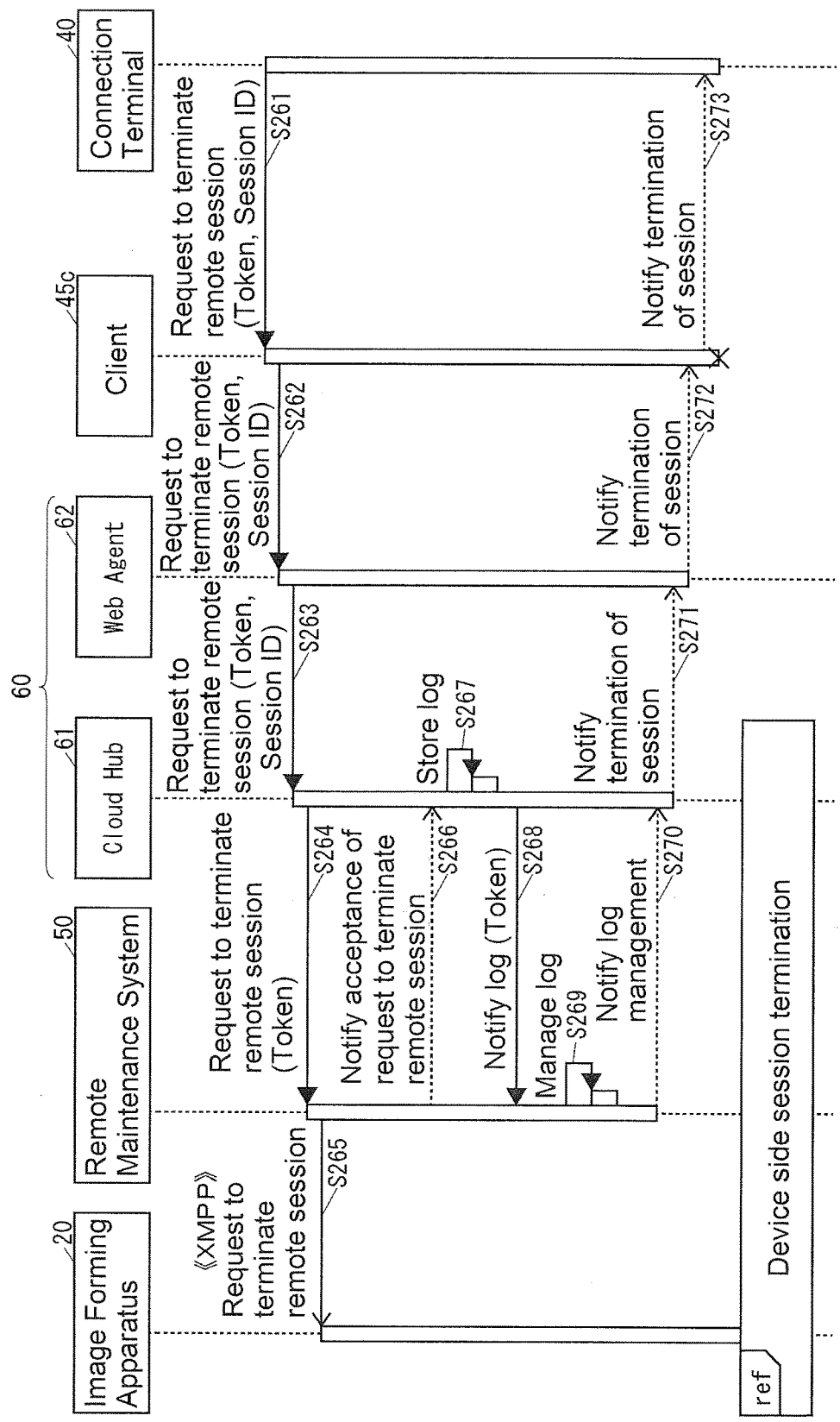
FIG. 13 illustrates an operation of the remote communication system according to the one embodiment when the remote session is terminated.
Figure 14:
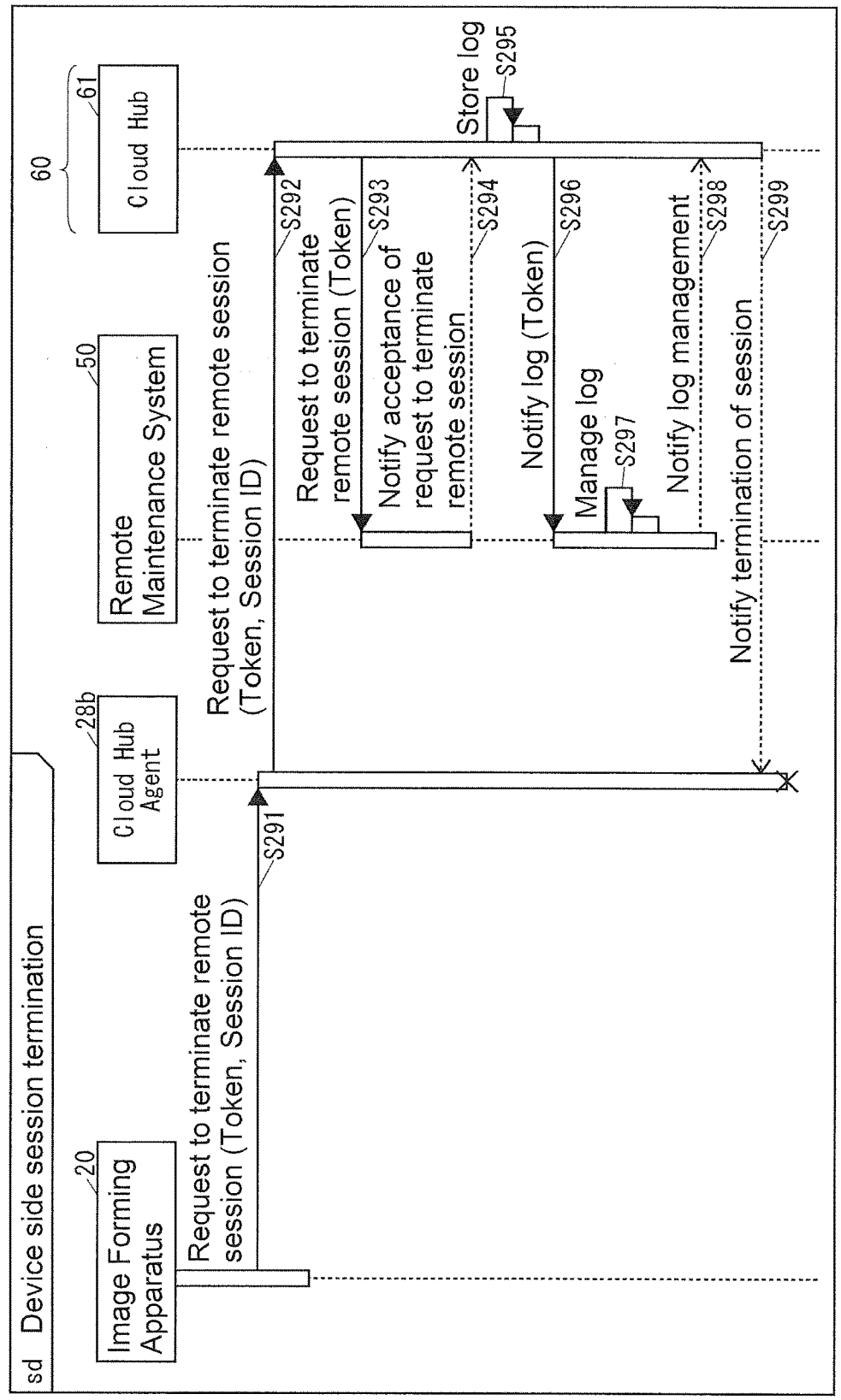
FIG. 14 illustrates a sequence diagram of a device side session termination illustrated in FIG. 13.

FIG. 13 illustrates the operation of the remote communication system 10 when the remote session is terminated. FIG. 14 illustrates a sequence diagram of a device side session termination illustrated in FIG. 13.

The user of the connection terminal 40 can instruct termination of the remote session with a specific server application (hereinafter described as the server application 28a in the description of the operation illustrated in FIGS. 13 and 14) of a specific image forming apparatus (hereinafter described as the image forming apparatus 20 in the description of the operation illustrated in FIGS. 13 and 14) via the operation unit 41. When accepting the instruction to terminate the remote session, the remote session control unit 45d of the connection terminal 40 notifies the client 45c of the token and the session ID of the remote session instructed via the operation unit 41 as illustrated in FIGS. 13 and 14 to request the client 45c to terminate the remote session (Step S261). Accordingly, the client 45c requests the session relay system 60 to terminate the remote session requested at Step S261 by the WebSocket connection (Step S262).

When the termination of the remote session is requested at Step S262, the Web Agent 62 associated with a session ID included in the request at Step S262 among the Web Agents of the session relay system 60 passes this request to the Cloud Hub 61 (Step S263). Accordingly, the Cloud Hub 61 requests the remote maintenance system 50 to terminate the remote session identified by the token included in this request, using the API (Step S264).

When receiving the request of Step S264, the session management unit 55c of the remote maintenance system 50 requests the image forming apparatus 20 as a target of the remote session, which is a target of the request at Step S264, to terminate this remote session by the XMPP (Step S265).

Next, the session management unit 55c notifies the fact that the request to terminate the remote session is accepted to the session relay system 60, using the API (Step S266).

When the acceptance of the request to terminate the remote session is notified at Step S266, the Cloud Hub 61 of the session relay system 60 stores a log indicating the termination of the session with the connection terminal 40 in the session management database 64 (Step S267), and notifies the remote maintenance system 50 of the log stored at Step S267 together with the token, using the API (Step S268). Accordingly, the session management unit 55c of the remote maintenance system 50 manages the log notified at Step S268 as a log of the remote session identified by the token notified at Step S268 (Step S269), and replies the fact that this log is managed to the session relay system 60, using the API (Step S270).

When receiving the reply at Step S270, the Cloud Hub 61 of the session relay system 60 notifies the Web Agent 62 of the termination of the WebSocket connection between the connection terminal 40 and the session relay system 60 (Step S271). Accordingly, the Web Agent 62 notifies the connection terminal 40 of the termination of the WebSocket connection between the connection terminal 40 and the session relay system 60 (Step S272).

When receiving the notification at Step S272, the client 45c of the connection terminal 40 notifies the remote session control unit 45d of the termination of the WebSocket connection between the connection terminal 40 and the session relay system 60 (Step S273), and terminates its operation.

Accordingly, the remote session control unit 45d can, for example, display the fact that the WebSocket connection between the connection terminal 40 and the session relay system 60 is terminated on the display 42.

When receiving the request at Step S265, the server application 28a as the target of the remote session as the target of the request received at Step S265 among the server applications of the image forming apparatus 20 notifies the Cloud Hub Agent 28b of the token and the session ID of this remote session to request the Cloud Hub Agent 28b to terminate the remote session (Step S291). Accordingly, the Cloud Hub Agent 28b requests the session relay system 60 to terminate the remote session requested at Step S291 by the WebSocket connection (Step S292).

When receiving the request of Step S292, the Cloud Hub 61 of the session relay system 60 requests the remote maintenance system 50 to terminate the remote session identified by the token included in this request, using the API (Step S293).

When receiving the request of Step S293, the session management unit 55c of the remote maintenance system 50 notifies the session relay system 60 of the fact that the request to terminate the remote session is accepted, using the API (Step S294).

When the acceptance of the request to terminate the remote session is notified at Step S294, the Cloud Hub 61 of the session relay system 60 stores a log indicating the termination of the session with the image forming apparatus 20 in the session management database 64 (Step S295), and notifies the remote maintenance system 50 of the log stored at Step S295 together with the token, using the API (Step S296). Accordingly, the session management unit 55c of the remote maintenance system 50 manages the log notified at Step S296 as a log of the remote session identified by the token notified at Step S296 (Step S297), and replies the fact that this log is managed to the session relay system 60, using the API (Step S298).

When receiving the reply at Step S298, the Cloud Hub 61 of the session relay system 60 notifies the image forming apparatus 20 of the termination of the WebSocket connection between the image forming apparatus 20 and the session relay system 60 (Step S299).

When receiving the notification at Step S299, the Cloud Hub Agent 28b of the image forming apparatus 20 terminates its operation.

When the session management unit 55c of the remote maintenance system 50 confirms both that the log indicating the termination of the session between the image forming apparatus 20 and the session relay system 60 is notified from the session relay system 60 and that the log indicating the termination of the session between the connection terminal 40 and the session relay system 60 is notified from the session relay system 60, the session management unit 55c of the remote maintenance system 50 determines that the remote session between the image forming apparatus 20 and the connection terminal 40 via the session relay system 60 is terminated. When the session management unit 55c determines that the remote session between the image forming apparatus 20 and the connection terminal 40 via the session relay system 60 is not terminated, the session management unit 55c does not permit to establish a new remote session between the image forming apparatus 20 and the connection terminal 40 via the session relay system 60.

Next, an operation of the remote communication system 10 when the remote maintenance is executed via the remote maintenance system 50 will be described.

Figure 15:
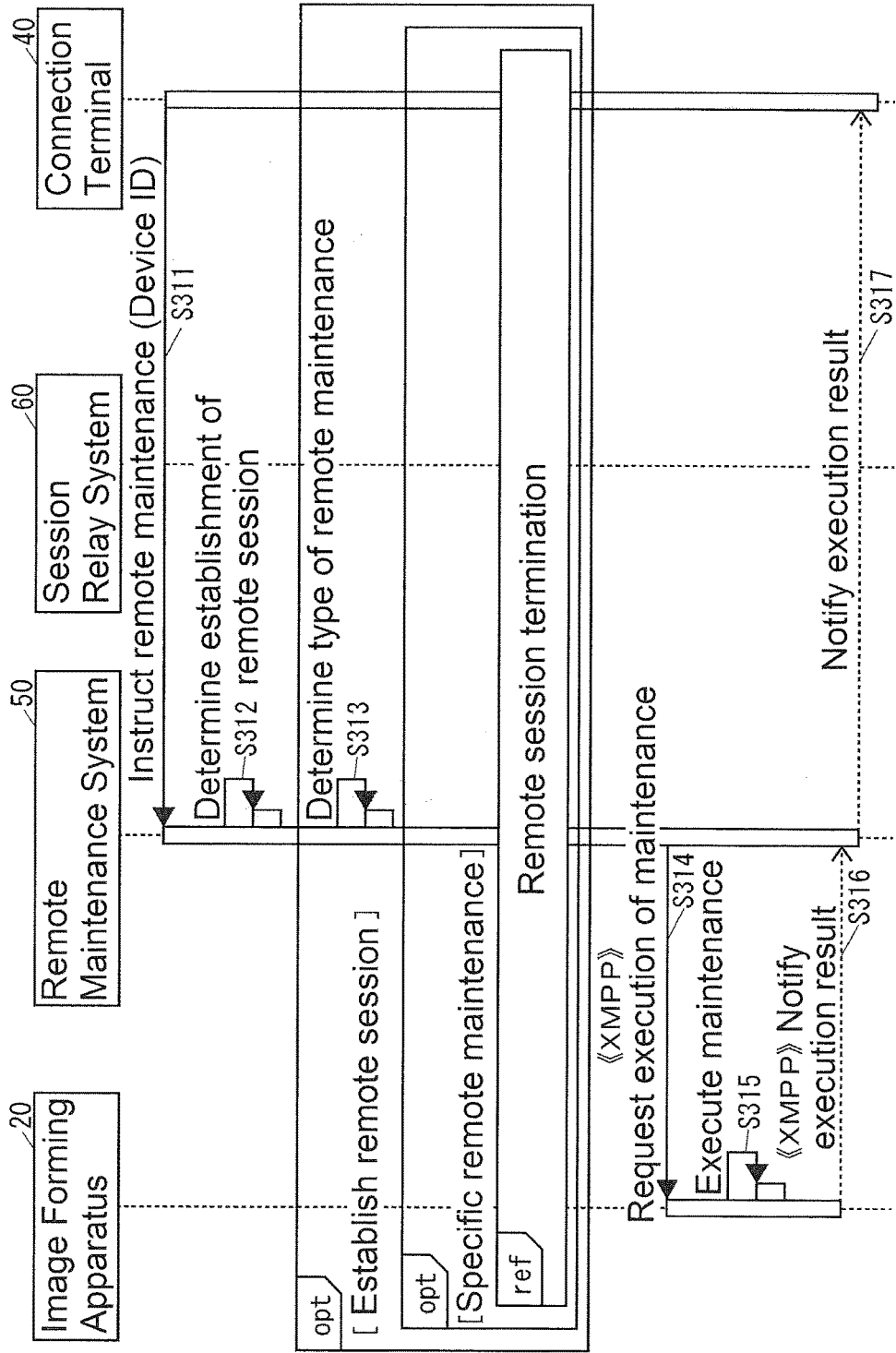
FIG. 15 illustrates an operation of the remote communication system according to the one embodiment when a remote maintenance is executed via the remote maintenance system.
Figure 16:
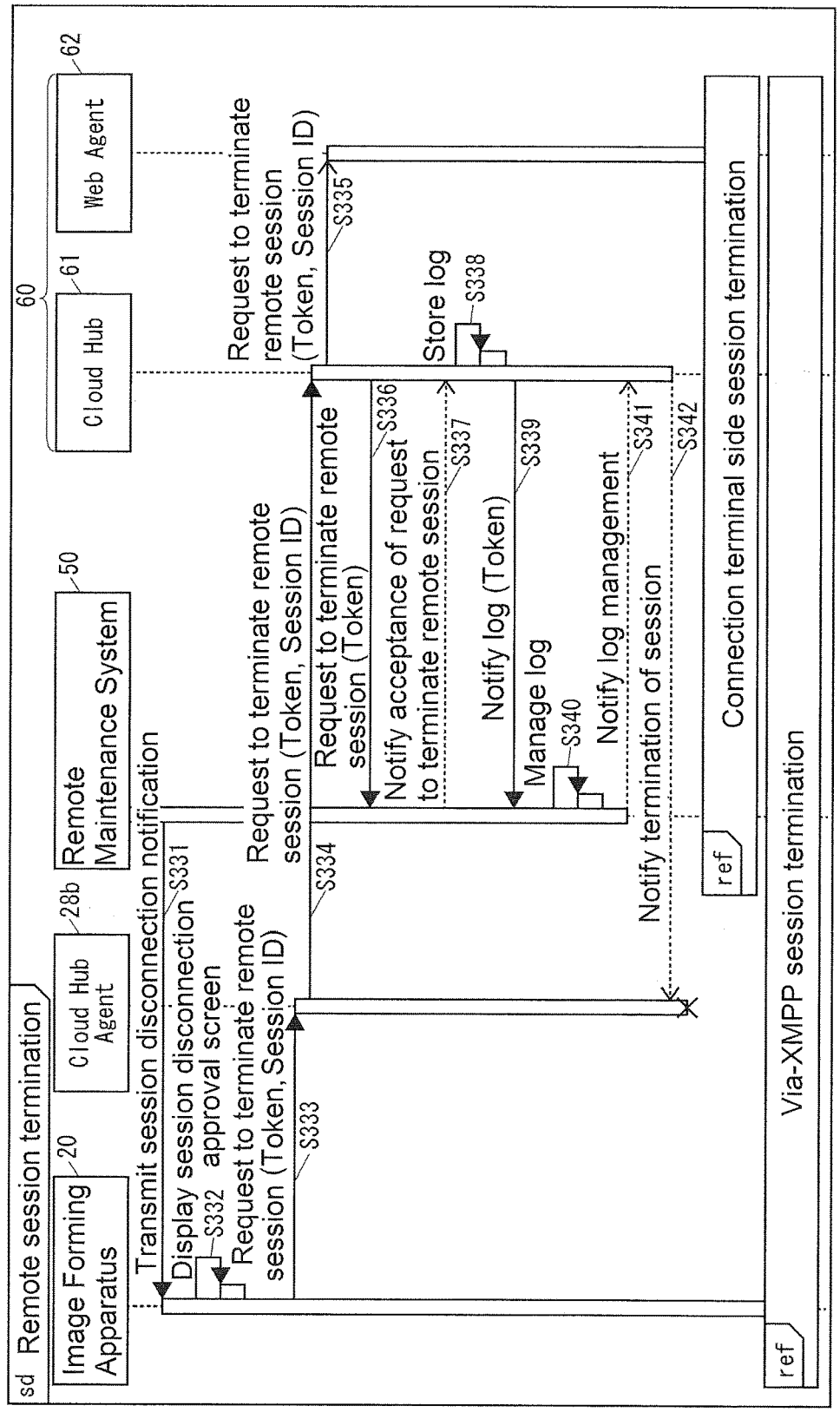
FIG. 16 illustrates a sequence diagram of a remote session termination illustrated in FIG. 15.
Figure 17:
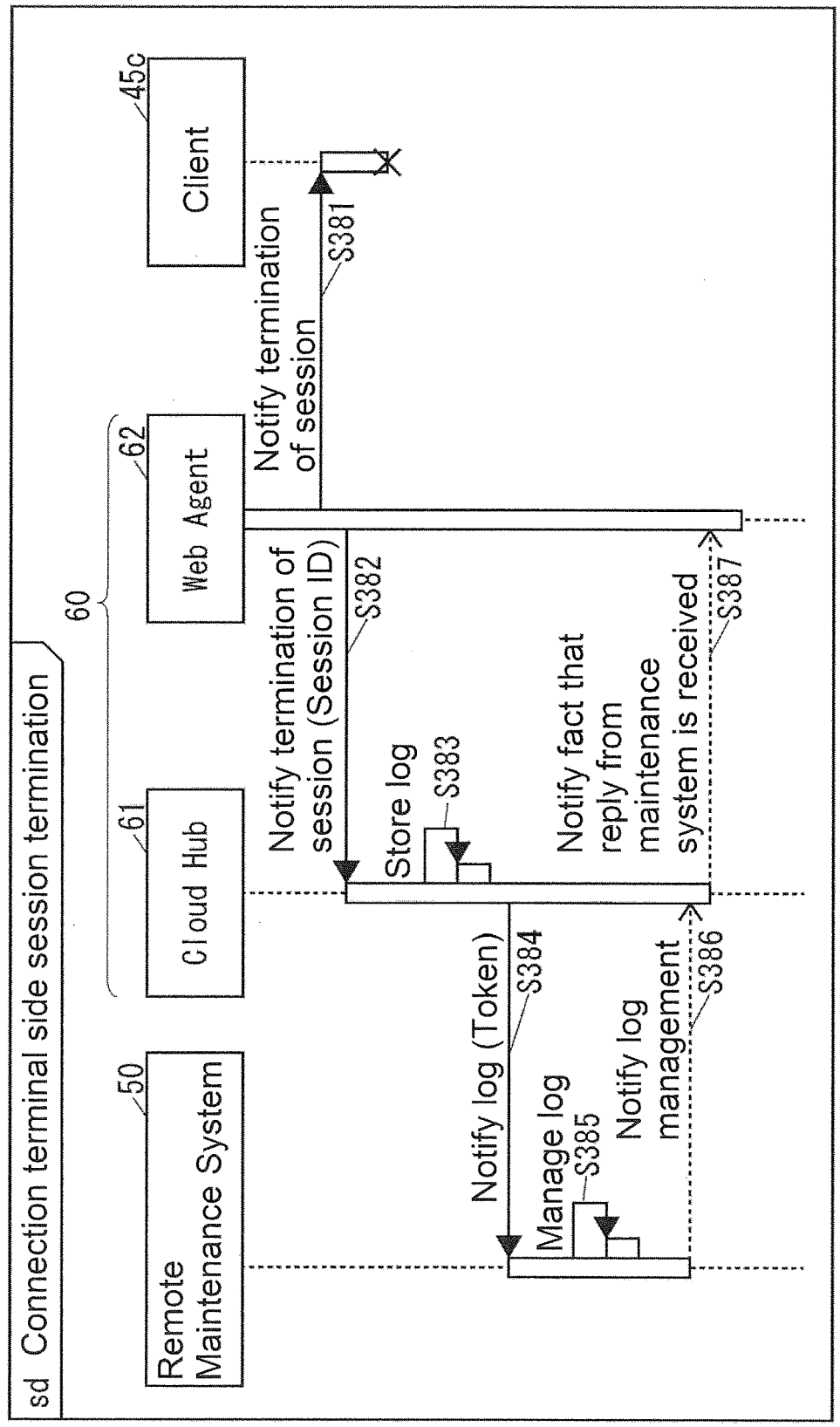
FIG. 17 illustrates a sequence diagram of a connection terminal side session termination illustrated in FIG. 16.
Figure 18:
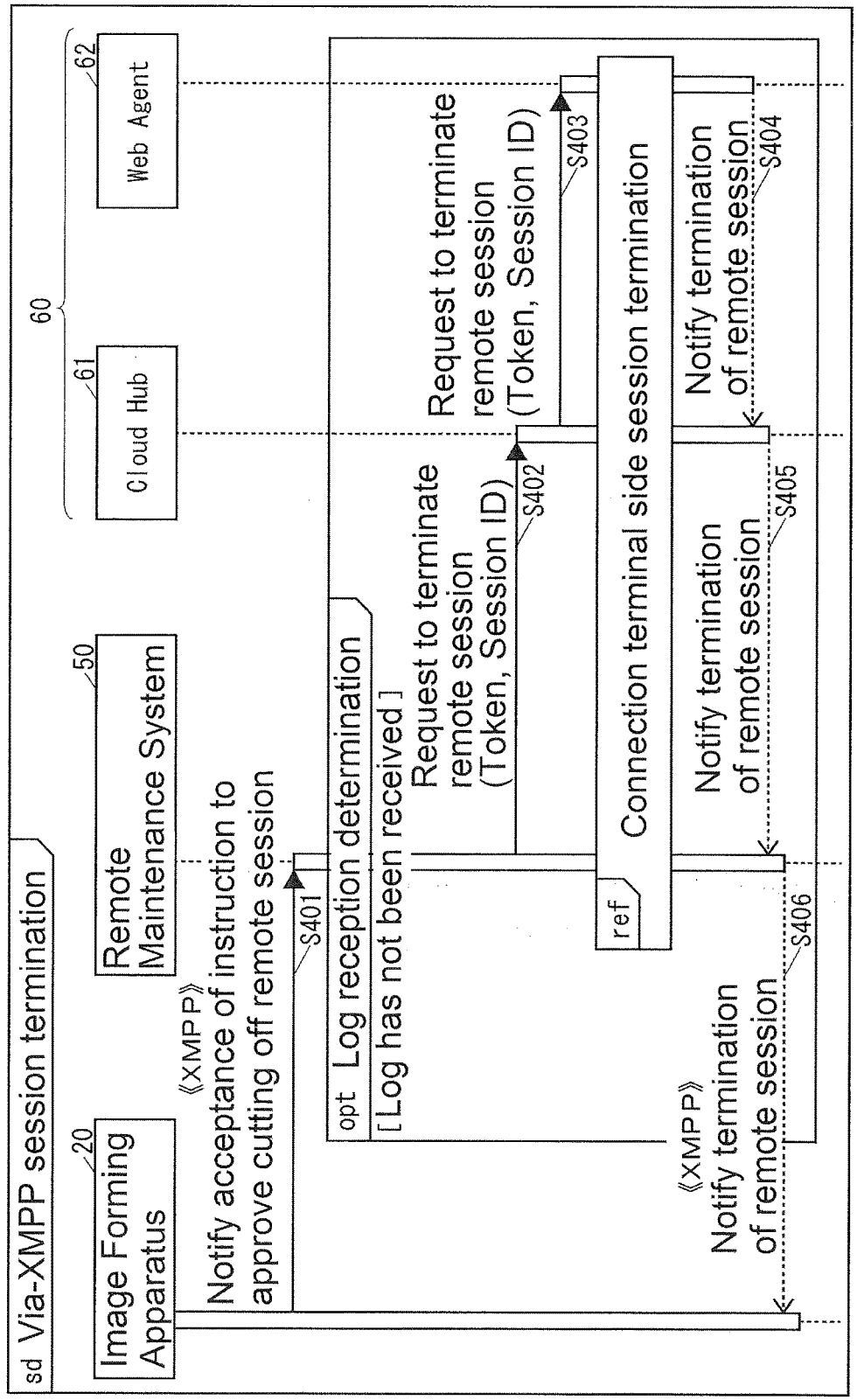
FIG. 18 illustrates a sequence diagram of a via-XMPP session termination illustrated in FIG. 16.

FIG. 15 illustrates the operation of the remote communication system 10 when the remote maintenance is executed via the remote maintenance system 50. FIG. 16 illustrates a sequence diagram of the remote session termination illustrated in FIG. 15. FIG. 17 illustrates a sequence diagram of the connection terminal side session termination illustrated in FIG. 16. FIG. 18 illustrates a sequence diagram of a via-XMPP session termination illustrated in FIG. 16.

When logging in to the remote maintenance system 50, the user of the connection terminal 40 can instruct the remote maintenance of a specific image forming apparatus (hereinafter described as the image forming apparatus 20 in the description of the operation illustrated in FIG. 15) via the remote maintenance system 50. This remote maintenance is instructed via the operation unit 41. When accepting the instruction of the remote maintenance via the remote maintenance system 50, the remote maintenance instruction unit 45b of the connection terminal 40 notifies the remote maintenance system 50 of a device ID of the image forming apparatus 20 instructed via the operation unit 41 as illustrated in FIGS. 15 to 18 to instruct the remote maintenance instructed via the operation unit 41 to the remote maintenance system 50 (Step S311).

When the session management unit 55c of the remote maintenance system 50 receives the instruction at Step S311, the session management unit 55c determines whether the image forming apparatus 20 has established the remote session or not (Step S312). Here, a user who has started the remote session that the image forming apparatus 20 establishes may differ from the user who has executed the instruction of the remote maintenance via the remote maintenance system 50.

When the session management unit 55c determines that the image forming apparatus 20 has established the remote session at Step S312, the session management unit 55c determines whether the remote maintenance corresponding to the instruction at Step S311 is any of the remote maintenances indicated by the influence maintenance type database 54b or not (Step S313).

When the session management unit 55c determines that the remote maintenance corresponding to the instruction at Step S311 is any of the remote maintenances indicated by the influence maintenance type database 54b at Step S314, the session management unit 55c transmits a session disconnection notification to the image forming apparatus 20 by the XMPP (Step S331).

When the server application 28a of the image forming apparatus 20 receives the session disconnection notification transmitted at Step S331, the server application 28a displays a session disconnection approval screen 470 (see FIG. 19) that accepts an instruction whether to approve the disconnection of the remote session or not on the display 22 (Step S332).

Figure 19:
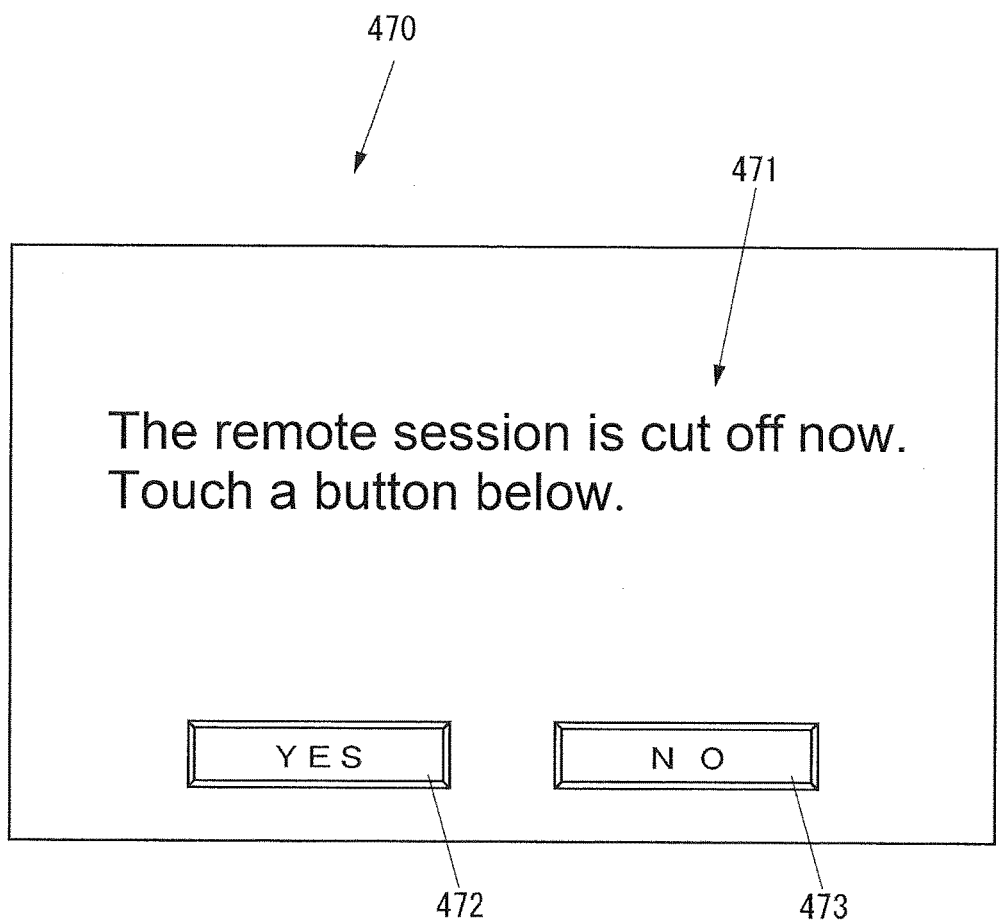
FIG. 19 illustrates an exemplary session disconnection approval screen displayed in the operation illustrated in FIG. 16.

FIG. 19 illustrates the exemplary session disconnection approval screen 470.

The session disconnection approval screen 470 illustrated in FIG. 19 includes a message 471, a YES button 472, and a NO button 473. The message 471 queries whether the disconnection of the remote session is approved or not. The YES button 472 is for accepting an instruction to approve the disconnection of the remote session. The NO button 473 is for accepting an instruction not to approve cutting off the remote session. The user of the image forming apparatus 20 can press any one of the YES button 472 and the NO button 473 via the operation unit 21.

As illustrated in FIGS. 15 to 18, when the YES button 472 is pressed via the operation unit 21, the server application 28a of the image forming apparatus 20 notifies the Cloud Hub Agent 28b of the token and the session ID of the target remote session to request the Cloud Hub Agent 28b to terminate the remote session to (Step S333). Accordingly, the Cloud Hub Agent 28b requests the session relay system 60 to terminate the remote session requested at Step S333 by the WebSocket connection (Step S334).

When receiving the request of Step S334, the Cloud Hub 61 of the session relay system 60 requests the Web Agent 62 to terminate the remote session requested at Step S334 (Step S335).

When receiving the request of Step S334, the Cloud Hub 61 of the session relay system 60 requests the remote maintenance system 50 to terminate the remote session identified by the token included in this request, using the API (Step S336).

When receiving the request of Step S336, the session management unit 55c of the remote maintenance system 50 notifies the session relay system 60 of the fact that the request to terminate the remote session is accepted, using the API (Step S337).

When the acceptance of the request to terminate the remote session is notified at Step S337, the Cloud Hub 61 of the session relay system 60 stores a log indicating the termination of the session with the image forming apparatus 20 in the session management database 64 (Step S338), and notifies the remote maintenance system 50 of the log stored at Step S338 together with the token, using the API (Step S339). Accordingly, the session management unit 55c of the remote maintenance system 50 manages the log notified at Step S339 as a log of the remote session identified by the token notified at Step S339 (Step S340), and replies the fact that this log is managed to the session relay system 60, using the API (Step S341).

When receiving the reply at Step S341, the Cloud Hub 61 of the session relay system 60 notifies the image forming apparatus 20 of the termination of the WebSocket connection between the image forming apparatus 20 and the session relay system 60 (Step S342).

When receiving the notification at Step S342, the Cloud Hub Agent 28b of the image forming apparatus 20 terminates its operation.

When the Web Agent 62 of the session relay system 60 receives the request at Step S335, the Web Agent 62 notifies all connection terminals (hereinafter described the connection terminal 40 as the representative; however, there may be a case where the connection terminal 40 is not included in the connection terminals that have established the remote session with the image forming apparatuses 20) that have established the remote session with the image forming apparatus 20 of the termination of the WebSocket connection with the session relay system 60 (Step S381).

When receiving the notification at Step S381, the client 45c of the connection terminal 40 terminates its operation.

After the process at Step S381, the Web Agent 62 of the session relay system 60 notifies the Cloud Hub 61 that the session with the connection terminal 40 is terminated (Step S382).

When the termination of the session with the connection terminal 40 is notified at Step S382, the Cloud Hub 61 of the session relay system 60 stores a log indicating that the session with the connection terminal 40 is terminated in the session management database 64 (Step S383), and notifies the remote maintenance system 50 of the log stored at Step S383 together with the token, using the API (Step S384). Accordingly, the session management unit 55c of the remote maintenance system 50 manages the log notified at Step S384 as a log of the remote session identified by the token notified at Step S384 (Step S385), and replies the fact that this log is managed to the session relay system 60, using the API (Step S386).

When receiving the reply at Step S386, the Cloud Hub 61 of the session relay system 60 notifies the Web Agent 62 of the fact that the reply from the remote maintenance system 50 is received (Step S387).

When the YES button 472 is pressed via the operation unit 21, the server application 28a of the image forming apparatus 20 notifies the remote maintenance system 50 of the fact that the instruction to approve the disconnection of the remote session is accepted by the XMPP (Step S401).

When the log notified at Step S384 is not yet received when receiving the notification at Step S401, the session management unit 55c of the remote maintenance system 50 notifies the session relay system 60 of the token and the session ID of the target remote session to request the session relay system 60 of the termination of the remote session (Step S402). Accordingly, the Cloud Hub 61 of the session relay system 60 requests the Web Agent 62 to terminate the remote session requested at Step S402 (Step S403).

The remote communication system 10 executes a process similar to the process at the above-described Steps S381 to S387 after the process at Step S403.

Next, the Web Agent 62 of the session relay system 60 notifies the Cloud Hub 61 of the termination of the remote session (Step S404). Accordingly, the Cloud Hub 61 of the session relay system 60 notifies the remote maintenance system 50 of the termination of the remote session (Step S405).

When receiving the notification of Step S405, the session management unit 55c of the remote maintenance system 50 notifies the image forming apparatus 20 of the termination of the remote session by the XMPP (Step S406).

When the log notified at Step S384 is already received when receiving the notification of Step S401, the session management unit 55c of the remote maintenance system 50 does not execute the process at the above-described Steps S402 to S406.

The reason why the processes at Steps S402 to S406 are executed when the log notified at Step S384 has not been yet received when the session management unit 55c receives the notification of Step S401 is as follows. The notification of the log from the Cloud Hub 61 of the session relay system 60 caused by the server application 28a of the image forming apparatus 20 requesting the Cloud Hub Agent 28b to terminate the remote session at Step S333 (Step S384) and the notification of the acceptance of the instruction to approve the disconnection of the remote session from the server application 28a of the image forming apparatus 20 via the XMPP (Step S401) are asynchronously executed; therefore it cannot be determined which one is executed first.

When the session management unit 55c of the remote maintenance system 50 confirms both that the log indicating the termination of the session between the image forming apparatus 20 and the session relay system 60 is notified from the session relay system 60 and that the log indicating the termination of the session between the connection terminal and the session relay system 60 associated with this session is notified from the session relay system 60, the session management unit 55c of the remote maintenance system 50 determines that the remote session between the image forming apparatus 20 and the connection terminal via the session relay system 60 is terminated. When the session management unit 55c determines that the remote session between the image forming apparatus 20 and the connection terminal via the session relay system 60 is not terminated, the session management unit 55c does not permit to establish a new remote session between the image forming apparatus 20 and the connection terminal via the session relay system 60.

After execution of any one of determinations of a determination that the image forming apparatus 20 does not establish the remote session at Step S312, a determination that the remote maintenance corresponding to the instruction at Step S311 is not any of the remote maintenances indicated in the influence maintenance type database 54b at Step S313, a determination that all remote sessions targeting the image forming apparatus 20 have been terminated after the remote maintenance corresponding to the instruction at Step S311 is determined as any of the remote maintenances indicated in the influence maintenance type database 54b at Step S313, by the session management unit 55c, the remote maintenance unit 55b of the remote maintenance system 50 requests the image forming apparatus 20 designated as the target for the remote maintenance from the connection terminal 40 to perform the maintenance instructed from the connection terminal 40 by the XMPP (Step S314).

When the remote maintenance system 50 requests the maintenance, the control unit 28 of the image forming apparatus 20 executes the maintenance requested by the remote maintenance system 50 (Step S315), and notifies the remote maintenance system 50 of an execution result of the maintenance by the XMPP (Step S316).

When the execution result of the maintenance is notified from the image forming apparatus 20, the remote maintenance unit 55b of the remote maintenance system 50 notifies the connection terminal 40 of the execution result notified from the image forming apparatus 20 (Step S317).

When a specific time passes without the determination of the termination of all remote sessions targeting the image forming apparatus 20 by the session management unit 55c after the determination that the remote maintenance corresponding to the instruction at Step S311 is any one of the remote maintenances indicated in the influence maintenance type database 54b at Step S313, the remote maintenance unit 55b notifies the connection terminal 40 of an error message saying "Since the remote session is in execution, the remote maintenance was not executed." Accordingly, the remote maintenance instruction unit 45b of the connection terminal 40 can cause the display 42 to display this error message, and the user of the connection terminal 40 can recognize the error message.

Figure 20:
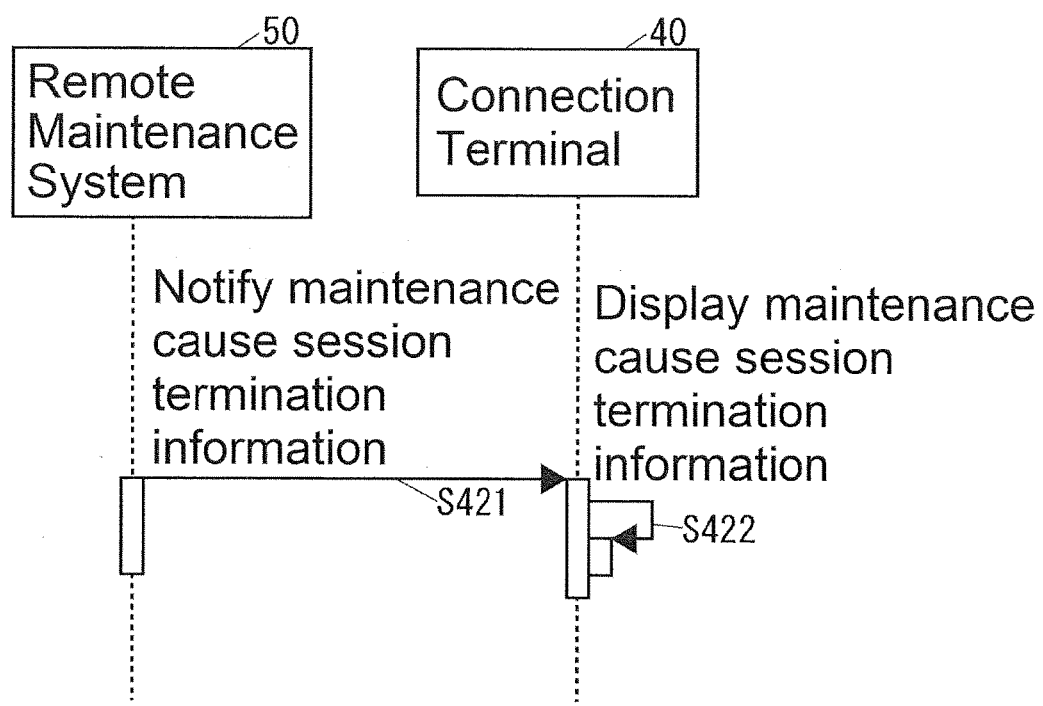
FIG. 20 illustrates an operation of a remote communication system according to the one embodiment when the remote maintenance system notifies the connection terminal of completion of disconnection of the remote session.

FIG. 20 illustrates an operation of the remote communication system 10 when the remote maintenance system 50 notifies the connection terminal of completion of the disconnection of the remote session.

As illustrated in FIG. 20, when the session management unit 55c of the remote maintenance system 50 receives the log notified from the Cloud Hub 61 of the session relay system 60 at Step S384, the session management unit 55c notifies the connection terminal (hereinafter described as the connection terminal 40 as the representative) as the target for this remote session of maintenance cause session termination information indicating the termination of the remote session by the instruction of execution of a specific remote maintenance (Step S421). In this example, the specific remote maintenance means any of the remote maintenances indicated in the influence maintenance type database 54b as the remote maintenance affecting the continuation of the remote session.

When the remote session control unit 45d of the connection terminal 40 receives the notification at Step S421, the remote session control unit 45d displays the maintenance cause session termination information on the display 42 (Step S422). Therefore, the user of the connection terminal 40 can recognize the termination of the remote session by the instruction to execute the specific remote maintenance.

There may be a case where the user of the connection terminal 40 logs out from the remote maintenance system 50 at a time point of the session management unit 55c of the remote maintenance system 50 receiving the log notified from the Cloud Hub 61 of the session relay system 60 at Step S384. In this case, the operation illustrated in FIG. 20 is executed after the user of the connection terminal 40 logs in to the remote maintenance system 50 again.

When the user of the connection terminal 40 logs out from the remote maintenance system 50 at the time point of the session management unit 55c of the remote maintenance system 50 receiving the log notified from the Cloud Hub 61 of the session relay system 60 at Step S384, the maintenance cause session termination information may be notified to an administrator of the image forming apparatus as the target for the remote session terminated by the instruction to execute the specific remote maintenance. The session management unit 55c of the remote maintenance system 50 may notify the administrator of the image forming apparatus as the target for the remote session terminated by the instruction to execute the specific remote maintenance of the maintenance cause session termination information regardless whether the user of the connection terminal 40 logs out from the remote maintenance system 50 at the time point of receiving the log notified from the Cloud Hub 61 of the session relay system 60 at Step S384.

The notification of the maintenance cause session termination information by the remote maintenance system 50 may be executed by various notification methods such as an e-mail.

As described above, in the remote communication control system 15, the image forming apparatus 20 and the connection terminal 40 located outside the network to which the image forming apparatus 20 belongs are not directly connected but establish the remote session relayed by the session relay system 60. This ensures improving the security when the image forming apparatus 20 is controlled from the connection terminal 40 located outside the network to which the image forming apparatus 20 belongs.

In the remote communication system 10, the image forming apparatus 20 establishes the WebSocket connection, which uses the session ID, with the session relay system 60 (Steps S171 to S180), the connection terminal 40 establishes the WebSocket connection, which uses the session ID, with the session relay system 60 (Steps S201 to S214), and the session relay system 60 relays the remote session by associating the connection established with the connection terminal 40 with the connection established with the image forming apparatus 20, using the session ID (Steps S231 to S243). With this configuration, in the remote communication system 10, only the connection terminal 40 notified of the session ID from the remote maintenance system 50 among the connection terminals located outside the network to which the image forming apparatus 20 belongs establishes the remote session with the image forming apparatus 20 relayed by the session relay system 60, thereby ensuring an improved security when the image forming apparatus 20 is controlled from the connection terminal 40 located outside the network to which the image forming apparatus 20 belongs.

In the remote communication system 10, the session ID used by the WebSocket connection established between the image forming apparatus 20 and the session relay system 60 and the session ID used by the WebSocket connection established between the connection terminal 40 and the session relay system 60 are identical session IDs. With this configuration, it is not necessary for the remote communication system 10 to associate two mutually different session IDs in the session relay system 60, thereby ensuring a simplified process of the session ID in the session relay system 60. The session ID used by the WebSocket connection established between the image forming apparatus 20 and the session relay system 60 and the session ID used by the WebSocket connection established between the connection terminal 40 and the session relay system 60 may be mutually different as long as they are associated with one another in the session relay system 60.

In the remote communication system 10, at least one of the WebSocket connection established between the session relay system 60 and the connection terminal 40 and the WebSocket connection established between the session relay system 60 and the image forming apparatus 20 may be a connection with encrypted communication, such as a Secure Sockets Layer (SSL). With this configuration, the remote communication system 10 has at least a part of a path of the remote session between the connection terminal 40 and the image forming apparatus 20 relayed by the session relay system 60 encrypted, thereby ensuring reducing an occurrence of an invalid use, such as cracking, to the image forming apparatus 20.

In the remote communication system 10, the remote maintenance system 50 accepts the request (Step S141) to start the remote session from the connection terminal 40 when the user of the connection terminal 40 is logged in to the remote maintenance system 50. The remote maintenance system 50 does not execute the notification (Step S149) of the session ID to the image forming apparatus 20 and the notification (Step S202) of the session ID to the connection terminal 40 when the request to start the remote session is not accepted from the connection terminal 40. With this configuration, the remote communication system 10 has the remote session between the connection terminal 40 and the image forming apparatus 20 relayed by the session relay system 60 established only when the user of the connection terminal 40 can log in to the remote maintenance system 50, thereby ensuring the improved security of this remote session.

In the remote communication system 10, the remote maintenance system 50 does not execute the notification (Step S149) of the session ID to the image forming apparatus 20 and the notification (Step S202) of the session ID to the connection terminal 40 when the start of the remote session is not approved from the user of the image forming apparatus 20. With this configuration, the remote communication system 10 has the remote session between the connection terminal 40 and the image forming apparatus 20 relayed by the session relay system 60 established only when the start of the remote session is approved by the user of the image forming apparatus 20, thereby ensuring the improved security of this remote session. The remote maintenance system 50 may be configured not to execute any one of the notification of the session ID to the image forming apparatus 20 and the notification of the session ID to the connection terminal 40 when the start of the remote session is not approved by the user of the image forming apparatus 20.

In the remote communication system 10, the session relay system 60 changes the session ID (Step S146) every time the session ID is requested by the remote maintenance system 50 (Step S145). With this configuration, the remote communication system 10 has the session ID changed every time the remote session between the connection terminal 40 and the image forming apparatus 20 relayed by the session relay system 60 is established, thereby ensuring the improved security of this remote session.

The remote communication system 10 displays the screen identical to the screen displayed on the image forming apparatus 20 on the connection terminal 40 located in the outside of the network to which the image forming apparatus 20 belongs so as to operate the image forming apparatus 20 from this connection terminal 40, thereby ensuring an easy operation of the image forming apparatus 20 from the connection terminal 40 located in the outside of the network to which the image forming apparatus 20 belongs at a low cost. For example, the connection terminal 40 is configured to cause the user of the connection terminal 40 to execute various kinds of settings to the image forming apparatus 20, such as a setting of an address book of the image forming apparatus 20, by displaying a setting screen of the image forming apparatus 20 on the display 42. The connection terminal 40 is configured to cause the user of the connection terminal 40 to execute confirmations of various pieces of information of the image forming apparatus 20, such as a confirmation of errors occurred in the image forming apparatus 20, a confirmation of a printed count with the image forming apparatus 20, and a remaining amount of a toner in the image forming apparatus 20, by, for example, displaying a confirmation screen for the various pieces of information of the image forming apparatus 20 on the display 42. The connection terminal 40 is configured to cause the user of the connection terminal 40 to execute installing various kinds of software to the image forming apparatus 20, such as an installation of firmware to the image forming apparatus 20 and an installation of an application to the image forming apparatus 20, by, for example, displaying an installation screen of software to the image forming apparatus 20 on the display 42.

The connection terminal 40 can communicate with various kinds of applications in the image forming apparatus 20 by the remote session, thereby ensuring implementing various functions besides the maintenance to the image forming apparatus 20.

When the remote communication control system 15 receives the instruction to execute the specific remote maintenance, such as the remote maintenance affecting the continuation of the remote session, from the connection terminal, the remote communication control system 15 appropriately terminates the remote session established to the image forming apparatus as the target for this remote maintenance. This ensures appropriately reducing a possibility of causing some sort of failure in the remote session such as an abnormal termination of the remote session and a long wait time until resumption of the remote session after an abnormal termination of the remote session by execution of the specific remote maintenance. Accordingly, the remote communication control system 15 can improve the quality of the remote session.

When receiving the instruction to execute the specific remote maintenance from the connection terminal, since the remote communication control system 15 terminates the remote session only when the user of the image forming apparatus approves the termination of the remote session (Step S333), termination of the remote session unintended by the user of the image forming apparatus can be prevented.

When receiving the instruction to execute the specific remote maintenance from the connection terminal, since the remote communication control system 15 notifies (Step S422) the user of the connection terminal who has requested the establishment of the remote session as the target for termination of the termination of the remote session, the user who has requested the establishment of the remote session as the target for the termination can recognize the termination of the remote session.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A remote communication control system comprising:
a session relay system that associates a connection established with an image forming apparatus with a connection established with an electronic device located outside a network to which the image forming apparatus belongs, so as to relay a remote session which is a direct interconnection between the image forming apparatus and the electronic device via a network;
a session management unit that manages the remote session; and
a remote maintenance unit that executes a remote maintenance to the image forming apparatus corresponding to an instruction from the electronic device,
wherein the session relay system stores a log relating to the remote session,
wherein when the session management unit of the remote maintenance system confirms both that the log indicating the termination of the remote session between the image forming apparatus and the session relay system is notified from the session relay system and that the log indicating the termination of the remote session between the electronic device and the session relay system is notified from the session relay system, the session management unit of the remote maintenance system determines that the remote session between the image forming apparatus and the electronic device via the session relay system is terminated.

2. The remote communication control system according to claim 1,
the image forming apparatus further includes a server application used from the electronic device included in the remote communication system via the remote session,
wherein after the server application of the image forming apparatus displays a session disconnection approval screen that accepts an instruction whether to approve the disconnection of the remote session or not on the display, when the disconnection of the remote session is approved via an operation unit of the image forming apparatus, the session management unit terminates the remote session only when a user of the image forming apparatus approves the termination of the remote session.

3. The remote communication control system according to claim 1,
wherein the session management unit notifies a user of the electronic device who has requested an establishment of the remote session of the termination of the remote session.

4. A remote maintenance system comprising:
a session management unit that manages a remote session relayed by a session relay system, the session relay system associating a connection established with an image forming apparatus with a connection established with an electronic device located outside a network to which the image forming apparatus belongs, so as to relay the remote session which is a direct interconnection between the image forming apparatus and the electronic device via a network; and
a remote maintenance unit that executes a remote maintenance to the image forming apparatus corresponding to an instruction from the electronic device,
wherein the session relay system stores a log relating to the remote session,
wherein when the session management unit of the remote maintenance system confirms both that the log indicating the termination of the remote session between the image forming apparatus and the session relay system is notified from the session relay system and that the log indicating the termination of the remote session between the electronic device and the session relay system is notified from the session relay system, the session management unit of the remote maintenance system determines that the remote session between the image forming apparatus and the electronic device via the session relay system is terminated.

5. A non-transitory computer-readable recording medium storing a remote maintenance program, the remote maintenance program causing a computer to function as:
a session management unit that manages a remote session relayed by a session relay system, the session relay system associating a connection established with an image forming apparatus with a connection established with an electronic device located outside a network to which the image forming apparatus belongs, so as to relay the remote session which is a direct interconnection between the image forming apparatus and the electronic device via a network; and
a remote maintenance unit that executes a remote maintenance to the image forming apparatus corresponding to an instruction from the electronic device,
wherein the session relay system stores a log relating to the remote session,
wherein when the session management unit of the remote maintenance system confirms both that the log indicating the termination of the remote session between the image forming apparatus and the session relay system is notified from the session relay system and that the log indicating the termination of the remote session between the electronic device and the session relay system is notified from the session relay system, the session management unit of the remote maintenance system determines that the remote session between the image forming apparatus and the electronic device via the session relay system is terminated.

* * * * *